US012258127B2

(12) United States Patent
McIntosh et al.

(10) Patent No.: US 12,258,127 B2
(45) Date of Patent: Mar. 25, 2025

(54) CONVERTIBLE AIRCRAFT CABIN MONUMENT

(71) Applicant: The Boeing Company, Chicago, IL (US)

(72) Inventors: Darren Carl McIntosh, Mukilteo, WA (US); Jeff Siegmeth, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/499,196

(22) Filed: Oct. 12, 2021

(65) Prior Publication Data

US 2022/0177136 A1     Jun. 9, 2022

Related U.S. Application Data

(60) Provisional application No. 63/122,103, filed on Dec. 7, 2020.

(51) Int. Cl.
     *B64D 11/02*      (2006.01)
     *B64D 11/00*      (2006.01)

(52) U.S. Cl.
    CPC .......... *B64D 11/0023* (2013.01); *B64D 11/02* (2013.01)

(58) Field of Classification Search
    CPC ......... B64D 11/00; B64D 11/02; B64D 11/04; B64D 2011/0046
See application file for complete search history.

(56) References Cited

U.S. PATENT DOCUMENTS

| | | | | |
|---|---|---|---|---|
| 6,079,669 A | * | 6/2000 | Hanay | B64D 11/02 |
| | | | | 4/312 |
| 9,457,903 B2 | * | 10/2016 | Moje | B64D 11/02 |
| 2002/0062521 A1 | * | 5/2002 | Itakura | B64D 11/02 |
| | | | | 4/664 |
| 2013/0206906 A1 | * | 8/2013 | Burrows | B64D 11/0691 |
| | | | | 244/118.5 |
| 2013/0206907 A1 | * | 8/2013 | Burrows | B64D 11/02 |
| | | | | 244/118.5 |
| 2014/0123571 A1 | * | 5/2014 | Swain | B64D 11/0023 |
| | | | | 29/401.1 |
| 2014/0291446 A1 | * | 10/2014 | Reams | B64D 11/02 |
| | | | | 244/118.5 |
| 2014/0339363 A1 | * | 11/2014 | Moje | B64D 11/00 |
| | | | | 244/118.5 |
| 2014/0360099 A1 | * | 12/2014 | McIntosh | B64D 11/02 |
| | | | | 29/401.1 |

(Continued)

FOREIGN PATENT DOCUMENTS

DE     102011013049 A1 *   9/2012    ............. B64D 11/00
EP       2803578 A1    11/2014

(Continued)

*Primary Examiner* — Joshua J Michener
*Assistant Examiner* — Ryan Andrew Yankey
(74) *Attorney, Agent, or Firm* — COATS & BENNETT, PLLC

(57) ABSTRACT

Convertible monuments for aircraft cabins that house at least one lavatory can comprise moveable wall sections that can be reversibly deployed from a stowed configuration to a deployed configuration to form a temporary convertible monument having a monument footprint that overlaps at least a portion of an aircraft interior egress pathway during flight, and efficiently uses previously unused aircraft interior space during aircraft flight.

16 Claims, 14 Drawing Sheets

(56) References Cited

U.S. PATENT DOCUMENTS

| | | | |
|---|---|---|---|
| 2015/0360782 A1 | 12/2015 | Jin et al. | |
| 2016/0332718 A1* | 11/2016 | Guering | B64D 45/0028 |
| 2018/0251222 A1* | 9/2018 | Banfield | E04H 1/1216 |
| 2019/0337623 A1* | 11/2019 | Vaninetti | B64D 11/0691 |
| 2021/0039787 A1* | 2/2021 | Boustani | B64D 11/0602 |
| 2022/0024591 A1* | 1/2022 | Dowty | B64D 11/0023 |
| 2022/0177137 A1* | 6/2022 | Roeder | B64D 11/04 |
| 2022/0212801 A1* | 7/2022 | Bradshaw | B64D 11/02 |
| 2022/0306297 A1* | 9/2022 | Clucas | B64D 11/02 |
| 2023/0103908 A1* | 4/2023 | Johnson | E06B 3/481 |
| | | | 244/118.6 |
| 2023/0356843 A1* | 11/2023 | Brown | B64D 11/02 |

FOREIGN PATENT DOCUMENTS

| | | | | |
|---|---|---|---|---|
| EP | 3608226 A1 * | 2/2020 | | B64D 11/0023 |
| EP | 3736214 A1 * | 11/2020 | | A47B 31/06 |
| EP | 3741676 A1 * | 11/2020 | | A47B 31/04 |
| EP | 3885262 A1 * | 9/2021 | | B64D 11/0007 |
| EP | 4023556 A1 * | 7/2022 | | B64C 1/1461 |
| EP | 3736214 B1 * | 9/2023 | | A47B 31/06 |
| WO | WO-2019213136 A1 * | 11/2019 | | B64D 11/0007 |

* cited by examiner

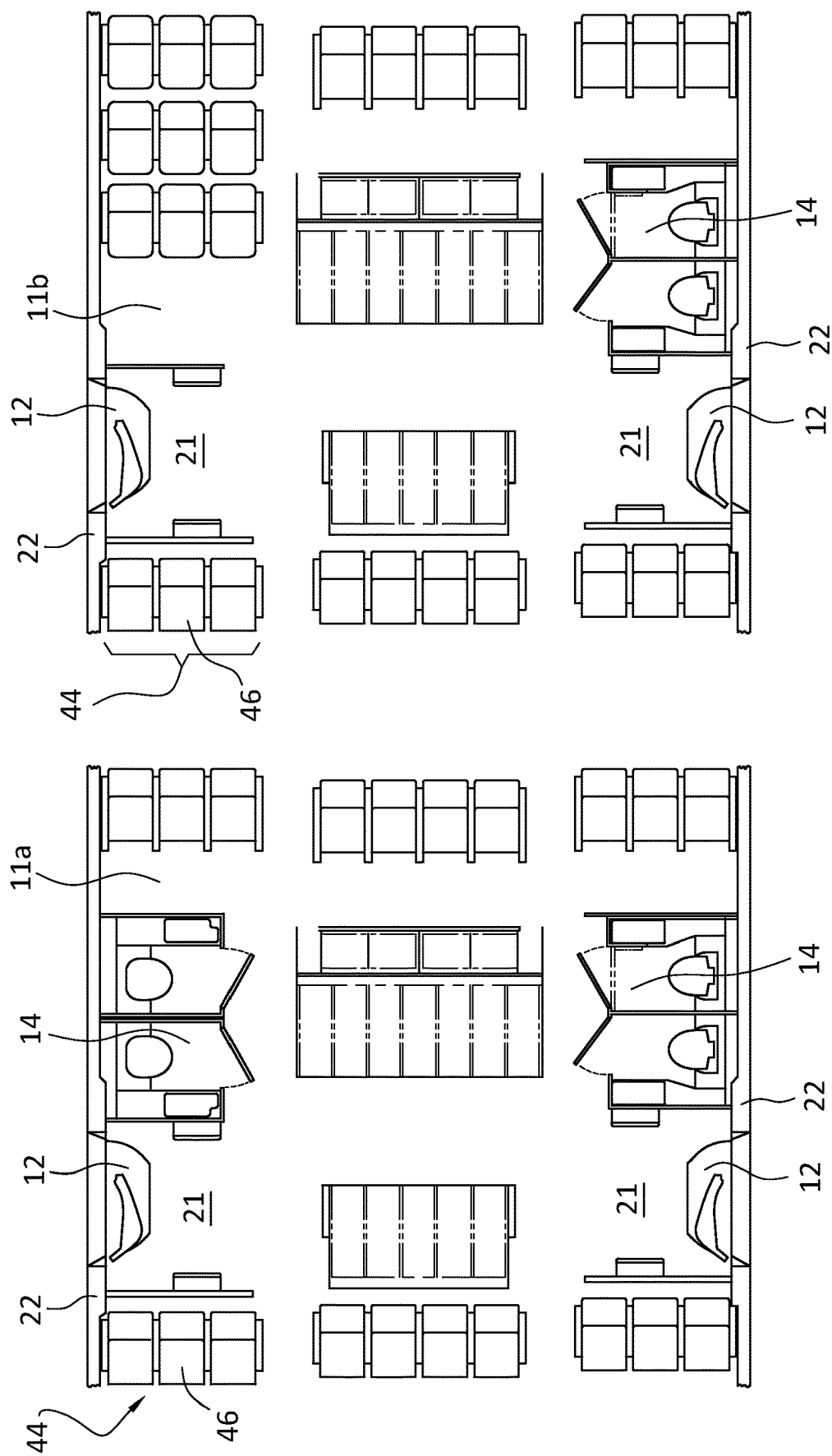

CONVERTIBLE AIRCRAFT CABIN MONUMENT

RELATED APPLICATIONS

This application claims priority to U.S. Provisional Patent Application Ser. No. 63/122,103 filed on Dec. 7, 2020, the entire contents of which are incorporated herein by reference.

TECHNOLOGICAL FIELD

The present disclosure relates generally to the field of aircraft cabin interior monuments. More specifically the present disclosure relates to the field of logistical orientation, construction, and implementation of monuments, having monument footprints, in an aircraft cabin environment.

BACKGROUND

Aircraft, including commercial aircraft, are confronted with the counter-balanced needs for passenger comfort, safety, etc., along with a need for passengers and attendants to access various locations within the aircraft cabin interior with ease, all the while observing and otherwise satisfying federal aviation requirements as to regions (e.g., including dimensions of regions) within the cabin interior including, but not limited to, ingress into and egress areas from the aircraft both under normal conditions and in cases of emergency.

These various counter-balanced needs significantly influence, and at times constrain the location and dimension of physical monuments within an aircraft cabin, as well as influence the construction, installation, usage, and utility, etc., of aircraft cabin interior monuments. Unless explicitly identified as such, no statement herein is admitted as prior art merely by its inclusion in the Background Section.

SUMMARY

Presently disclosed aspects can address significantly improved methods, systems, and apparatuses for utilizing unused space, especially unused space that is at a significant premium in aircraft cabin environments. For example, significant space efficiency, cost efficiency, component and commensurate overall aircraft weight reduction, performance enhancement, capacity enhancement, aesthetics, passenger comfort and satisfaction, etc., is realized in presently disclosed contained environments with a fixed amount of space, by conducting and transferring a function of a typical fixed monument within a particular environment (e.g., an aircraft cabin environment, etc.), to a temporary use and convertible monument that is relocated to a previously unused space within the aircraft cabin environment.

According to present aspects, a convertible aircraft cabin monument is disclosed including a plurality of moveable wall sections, with at least a number equal to or greater than one of the plurality of moveable wall sections in communication with one or more fixed structures, and with the plurality of moveable wall sections configured to convert from a stowed wall section configuration to a deployed wall section configuration. The plurality of moveable wall sections in the deployed wall section configuration is configured to form a convertible aircraft cabin monument in a deployed monument configuration, and the convertible aircraft cabin monument in the deployed configuration includes a deployed monument footprint, with the deployed monument footprint overlapping at least a portion of an aircraft cabin egress pathway.

In another aspect, the deployed monument footprint further overlaps at least a portion of an attendant area.

In another aspect, the convertible aircraft cabin monument comprises at least one lavatory.

In another aspect, the convertible aircraft cabin monument comprises at least a first compartment.

In a further aspect, the convertible aircraft cabin monument comprises a plurality of compartments.

In another aspect, the plurality of moveable wall sections comprise a folding mechanism that can be a hinge mechanism.

In another aspect, the plurality of moveable wall sections are configured to manually convert on demand from the stowed wall section configuration to the deployed wall section configuration.

In a further aspect, the plurality of moveable wall sections are configured to automatically convert on demand from the stowed wall section configuration to deployed wall section configuration.

In another aspect, at least two of the plurality of moveable wall sections are configured to attach to at least one fixed structure.

In a further aspect, the lavatory comprises a urinal.

In another aspect, at least two of the plurality of compartments are configured to convert into a single compartment.

In another aspect, the convertible aircraft cabin monument comprises at least one urinal.

In another aspect, at least two of the plurality of compartments comprise an interior common wall.

According to further aspects, an aircraft is disclosed, with the aircraft including an aircraft cabin and an aircraft cabin egress pathway, with at least a portion of the aircraft cabin egress pathway oriented proximate to an aircraft door. The aircraft further includes a convertible aircraft cabin monument, with the convertible aircraft cabin monument including a plurality of moveable wall sections, with the plurality of moveable wall sections in communication with a plurality of fixed structures, and with the plurality of moveable wall sections configured to convert from a stowed wall section configuration to a deployed wall section configuration. The plurality of moveable wall sections in the deployed wall section configuration is configured to form a convertible aircraft cabin monument in a deployed monument configuration, with deployed monument configuration including a deployed monument footprint, and wherein the deployed monument footprint overlaps at least a portion of an aircraft cabin egress pathway.

In another aspect, the convertible aircraft cabin monument in the deployed configuration is configured to restrict access to a plane door when the aircraft is in flight.

According to further aspects, an aircraft is disclosed, with the aircraft including an aircraft cabin and an aircraft cabin egress pathway, with at least a portion of the aircraft cabin egress pathway oriented proximate to an aircraft door. The aircraft further includes a convertible aircraft cabin monument, with the convertible aircraft cabin monument including a plurality of moveable wall sections, with the plurality of moveable wall sections in communication with a plurality of fixed structures, and with the plurality of moveable wall sections configured to convert from a stowed wall section configuration to a deployed wall section configuration. The plurality of moveable wall sections in the deployed wall section configuration is configured to form a convertible aircraft cabin monument in a deployed monument configuration, with deployed monument configuration including a deployed monument footprint, and wherein the deployed monument footprint overlaps at least a portion of an aircraft cabin egress pathway. and wherein the lavatory comprises a urinal, and wherein the convertible aircraft cabin monument in the deployed aircraft cabin monument configuration is configured to restrict access to a plane door when the aircraft is in flight.

In another aspect, the convertible aircraft monument in the deployed aircraft cabin monument configuration is configured to restrict access to a plane door when the aircraft is in flight.

In a further aspect, the plurality of moveable wall sections are configured to automatically deploy from a stowed aircraft cabin monument configuration into a deployed aircraft cabin monument configuration when the aircraft is in flight.

In another aspect, a method for converting an unused aircraft cabin space into a convertible aircraft cabin monument is disclosed, with the method including providing a plurality of wall sections, moving the plurality of wall sections from a stowed wall section configuration into a deployed wall section configuration to form a plurality of deployed wall sections, and orienting the plurality of deployed wall sections to form a deployed monument, with the deployed monument comprising at least one enclosed compartment. The deployed monument further includes a deployed monument footprint, with the deployed monument further comprising at least one lavatory. The method further comprises overlapping at least a portion of an aircraft cabin egress pathway with at least a portion of the deployed monument footprint, with the at least a portion of the aircraft cabin egress pathway oriented adjacent an aircraft door. The method further comprises converting unused aircraft cabin space into a convertible aircraft cabin monument, with the convertible aircraft cabin monument comprising a convertible aircraft cabin monument footprint.

In another aspect, the deployed monument footprint overlaps at least a portion of an aircraft cabin egress pathway, with at least a portion of the aircraft cabin egress pathway oriented adjacent an aircraft door. The deployed monument further includes at least one lavatory and the method further includes converting unused aircraft cabin space into a convertible aircraft cabin monument with the monument comprising at least one lavatory.

In another aspect, the method further includes expanding the plurality of wall sections from a stowed configuration by at least one of; unfolding the plurality of wall sections; rolling the plurality of wall sections; and sliding the plurality of wall sections.

In another aspect, the method further includes forming the monument footprint by converting the plurality of wall sections from the stowed configuration to the deployed configuration.

In another aspect, at least a portion of the convertible aircraft cabin monument footprint is proximate to an aircraft door when the aircraft door is in a closed position and the aircraft is in flight.

In another aspect, the at least one deployed wall section is configured to restrict access of a passenger to the aircraft door when the aircraft door is in the closed position.

In a further aspect, the plurality of deployed wall sections are moveably connected.

In another aspect, the method includes joining the plurality of deployed wall sections into an engaged state.

According to another present aspect, a method for installing a convertible aircraft cabin monument is disclosed with the method including providing a plurality of wall sections, moveably connecting at least two wall sections of the plurality of wall sections, forming a plurality of moveably connected wall sections, securing at least a number greater than or equal to one of the plurality of moveably connected wall sections to a fixed structure. According to the method, the plurality of moveably connected wall section is configured to move from a stowed wall section configuration to a deployed wall section configuration, and with the plurality of moveably connected deployed wall sections in the deployed wall section configuration forming a convertible aircraft cabin monument having a convertible aircraft cabin monument footprint. The convertible aircraft cabin monument footprint is configured to at least overlap a portion of the aircraft cabin egress pathway.

In another aspect, the plurality of moveably connected wall sections is configured to move on demand from the stowed wall section configuration to the deployed wall section configuration.

In a further aspect, the plurality of moveably connected wall sections is configured to manually and/or automatically reversibly move the moveably connected wall sections from the stowed wall section configuration to the deployed wall section configuration.

In another aspect, the convertible aircraft cabin monument includes a plurality of lavatory compartments.

In a further aspect, the lavatory compartments are adjacent and share a common interior lavatory compartment wall.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
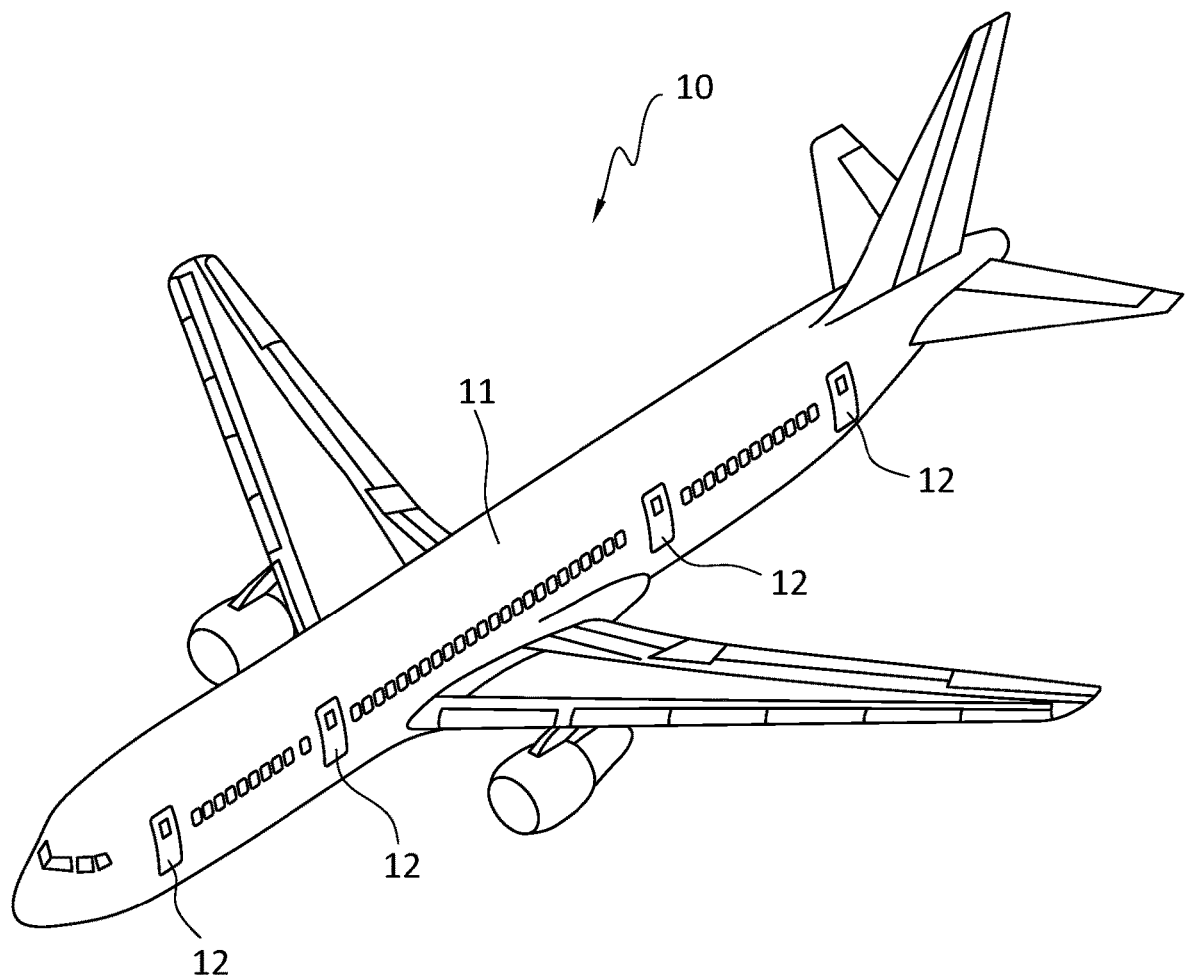
Figure 4:
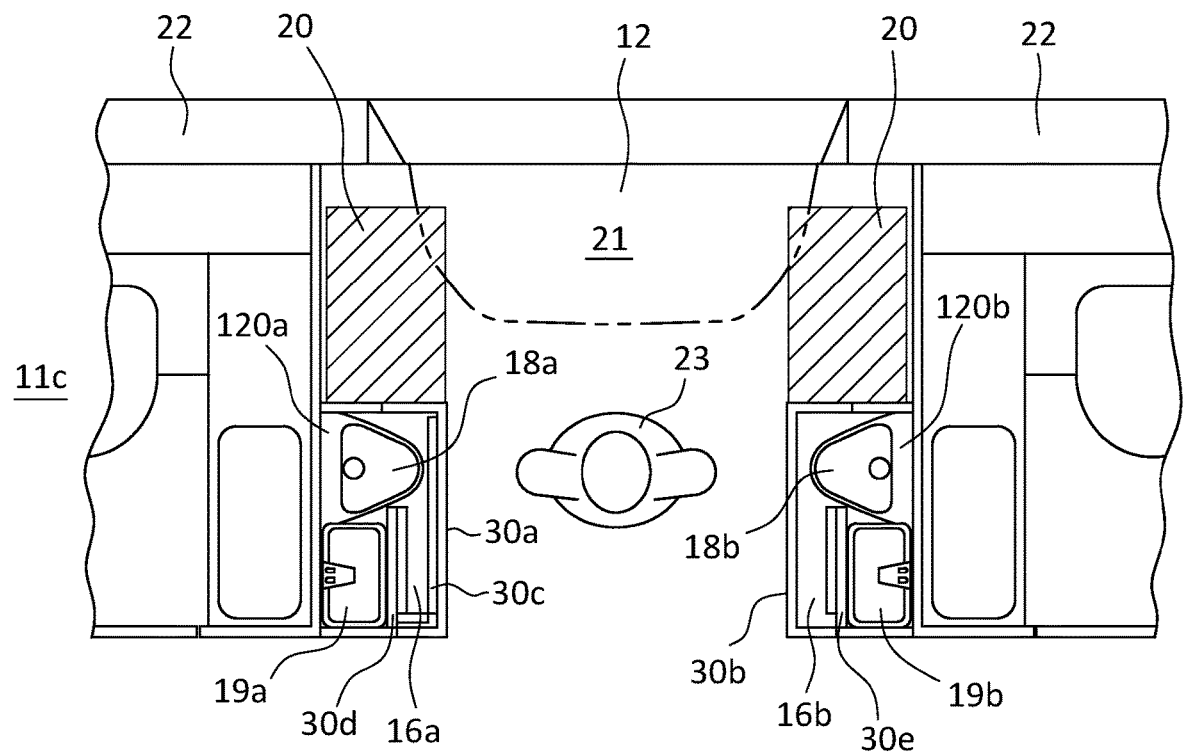
Figure 5:
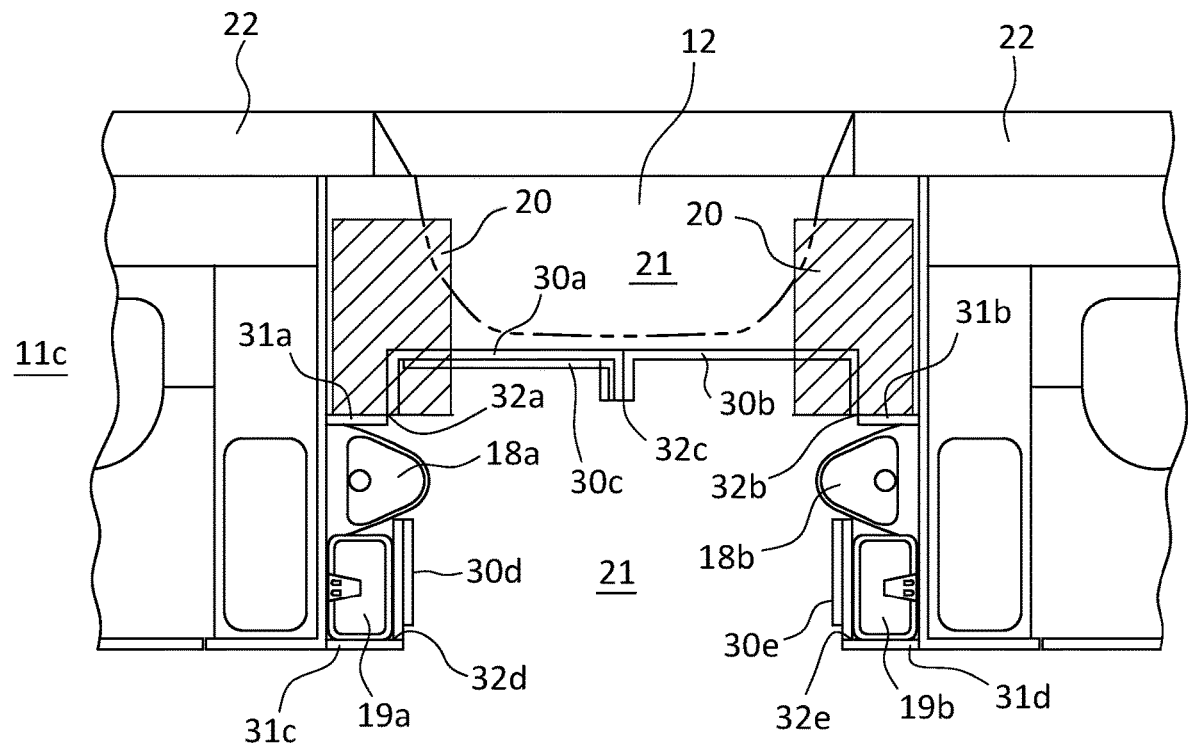
Figure 6:
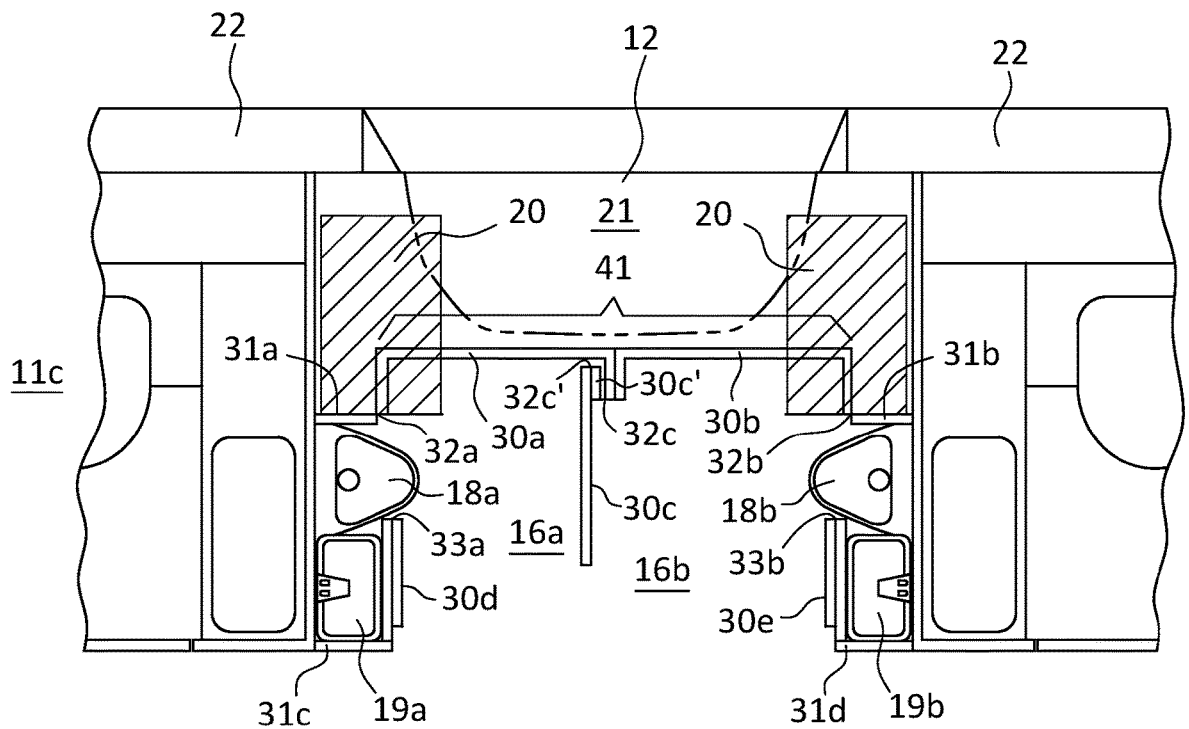
Figure 7:
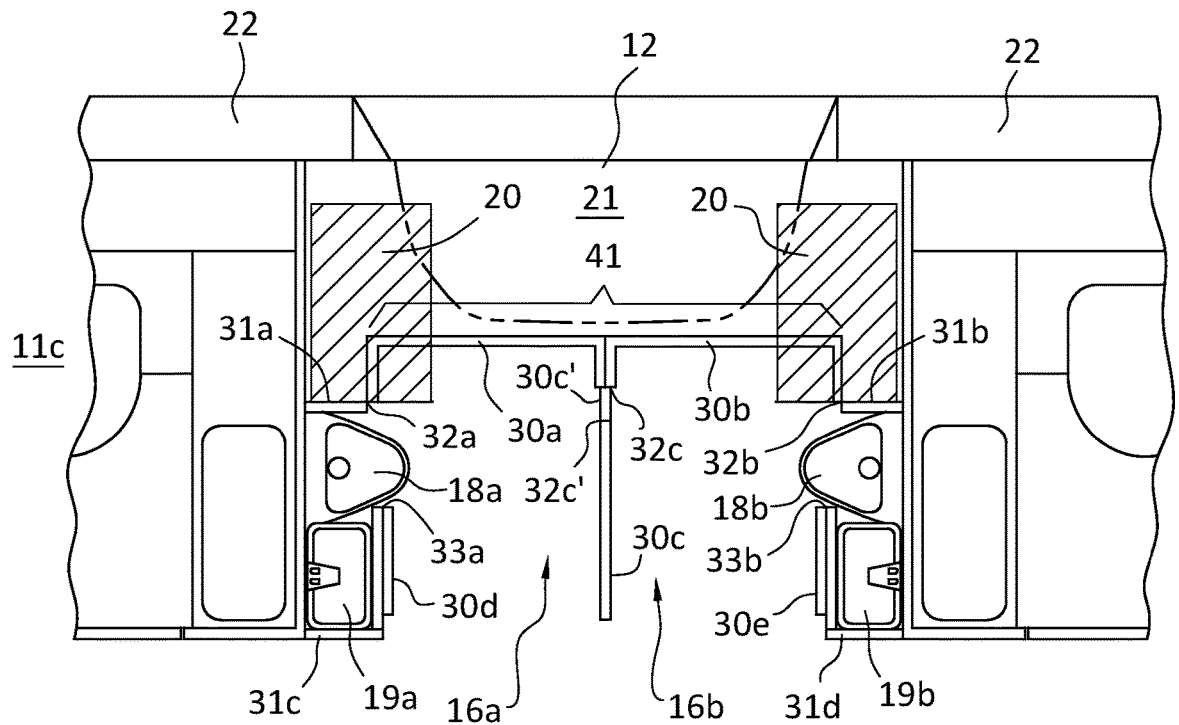
Figure 8:
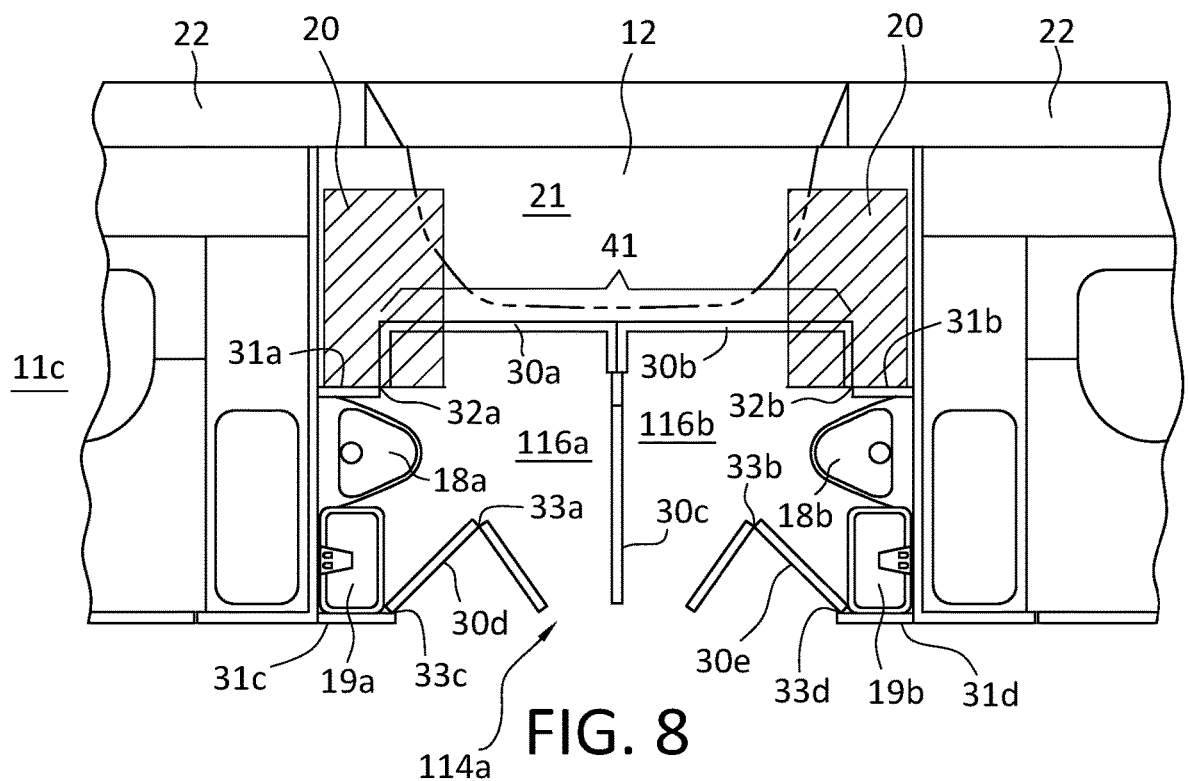
Figure 9:
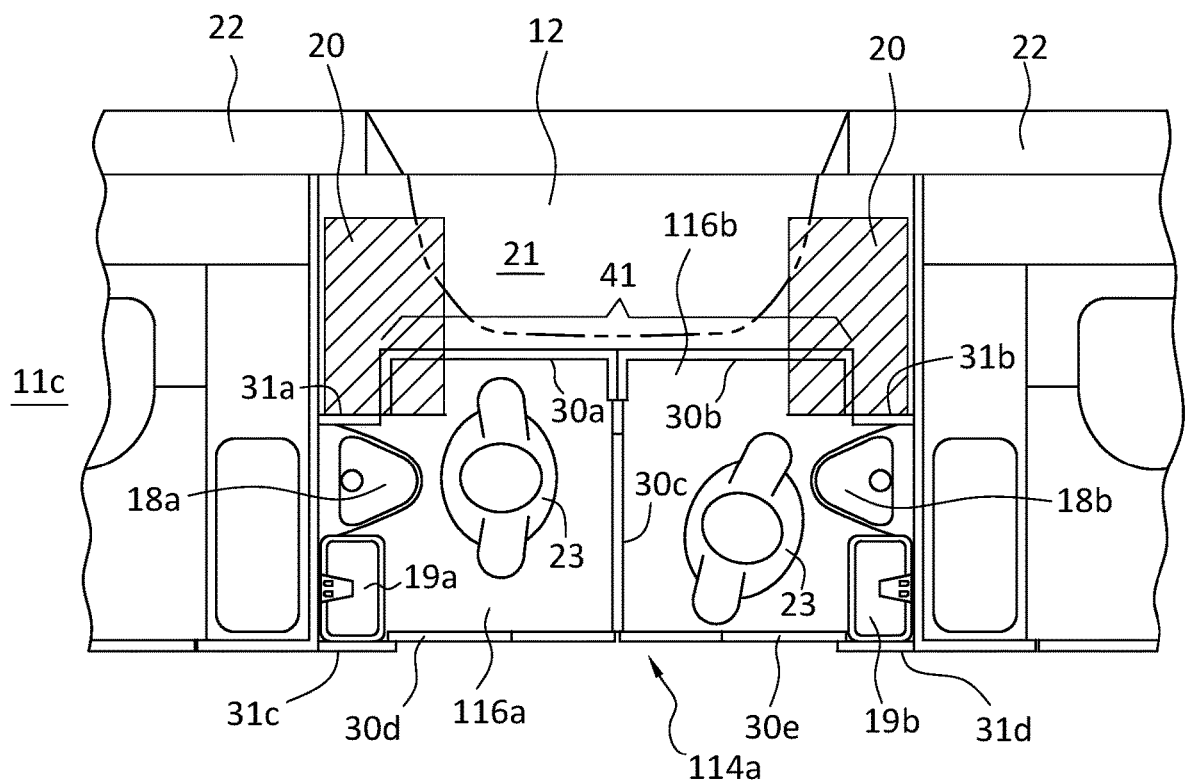
Figure 10:
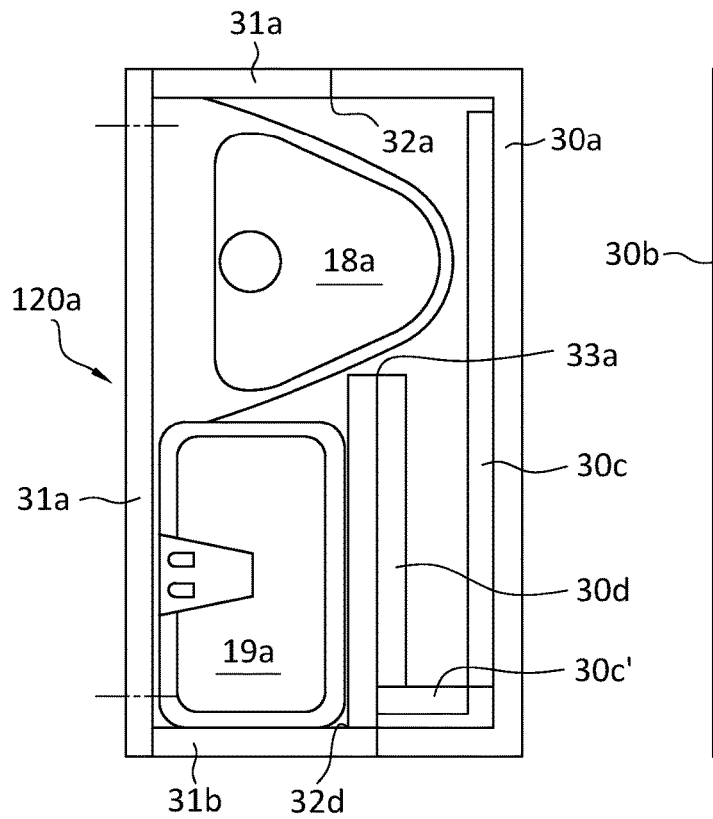
Figure 11:
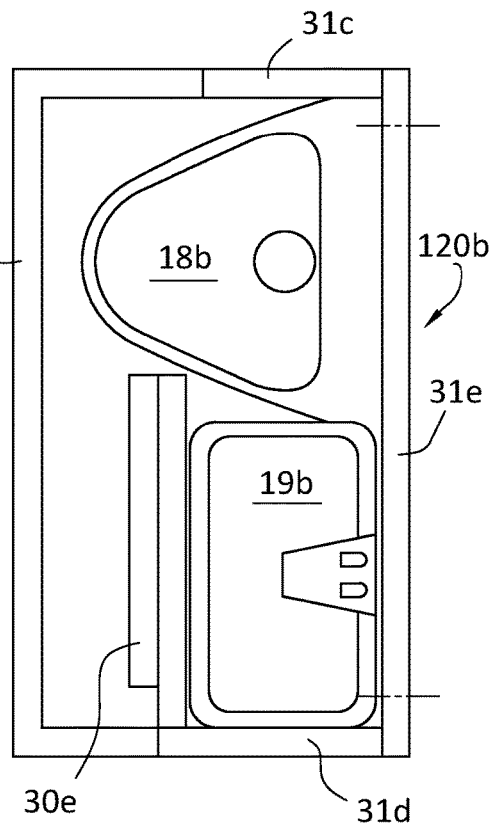
Figure 12:
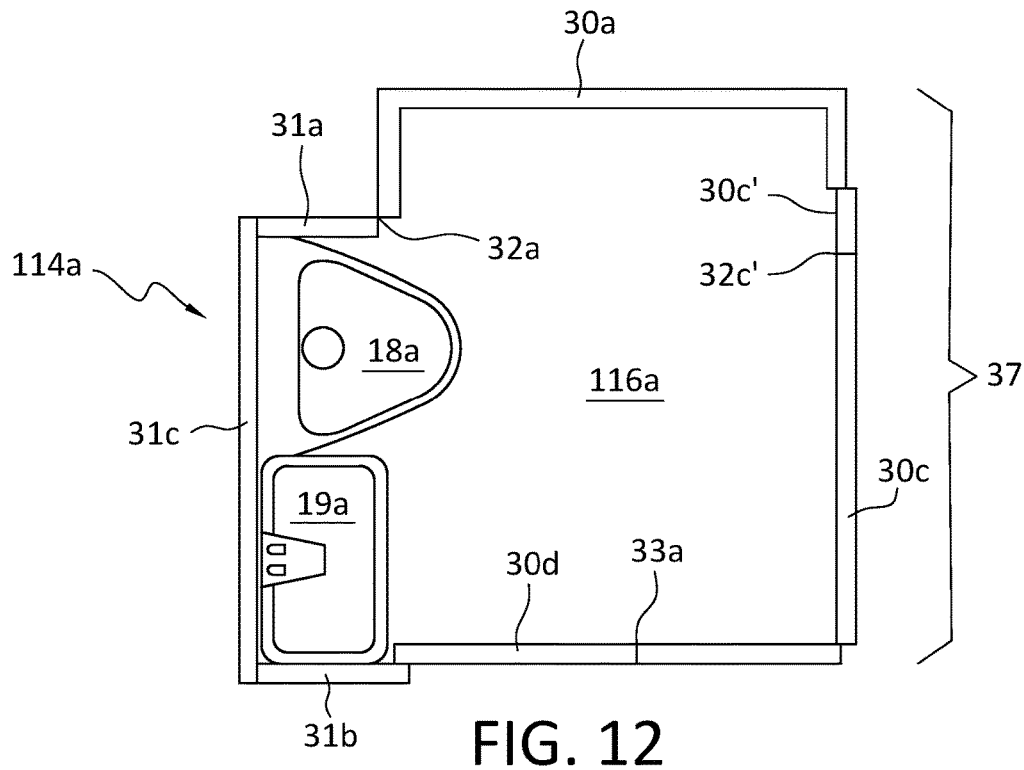
Figure 13:
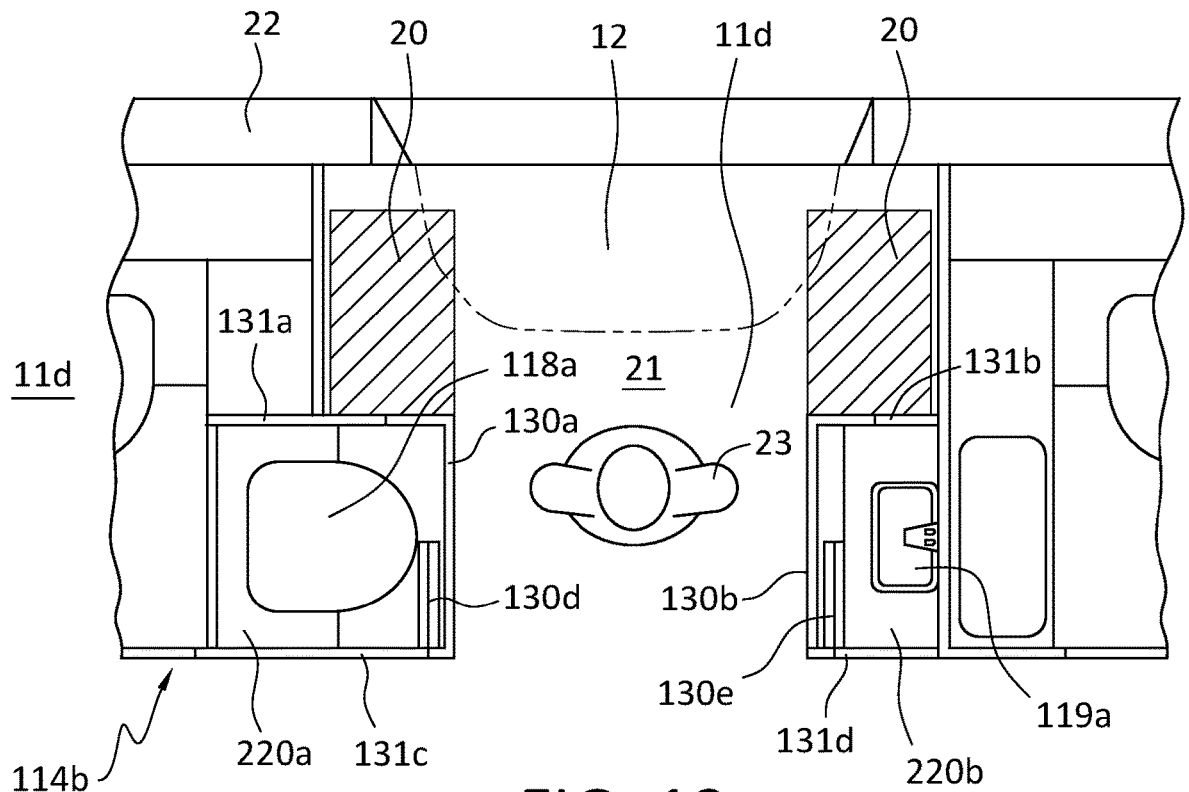
Figure 14:
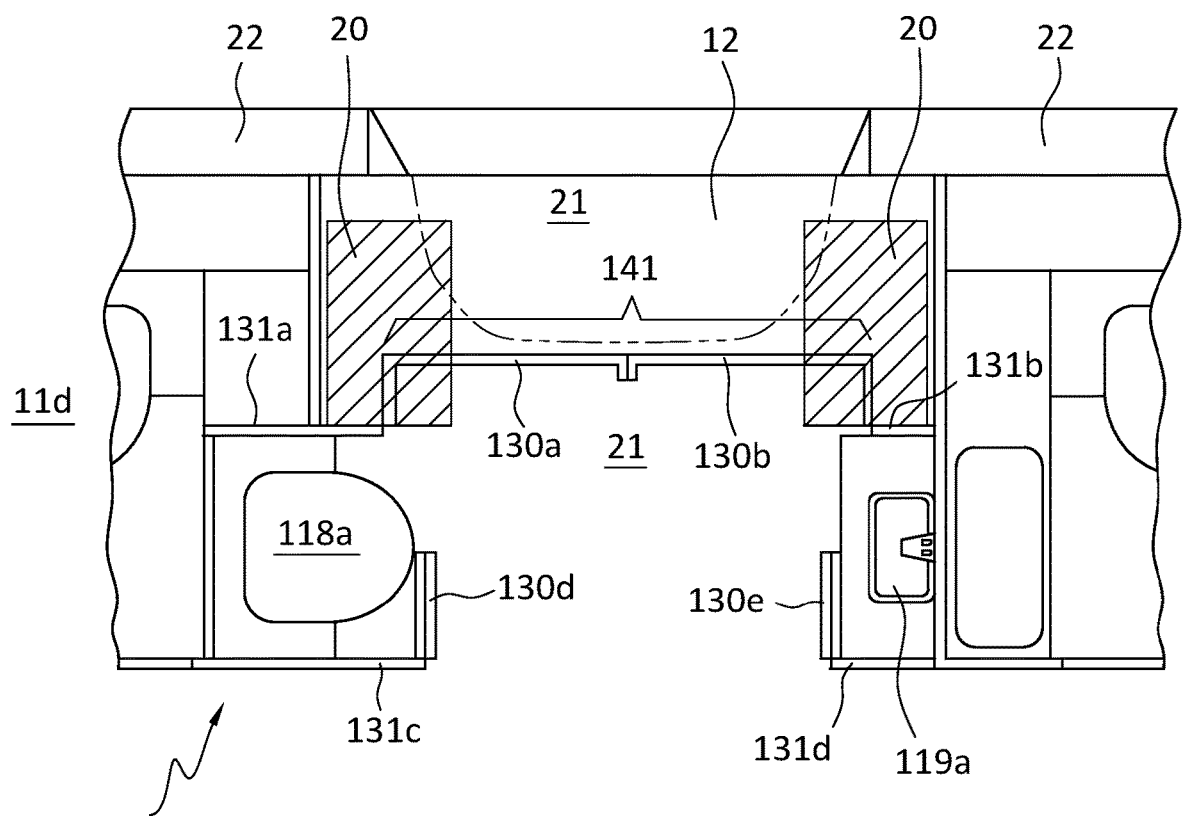
Figure 15:
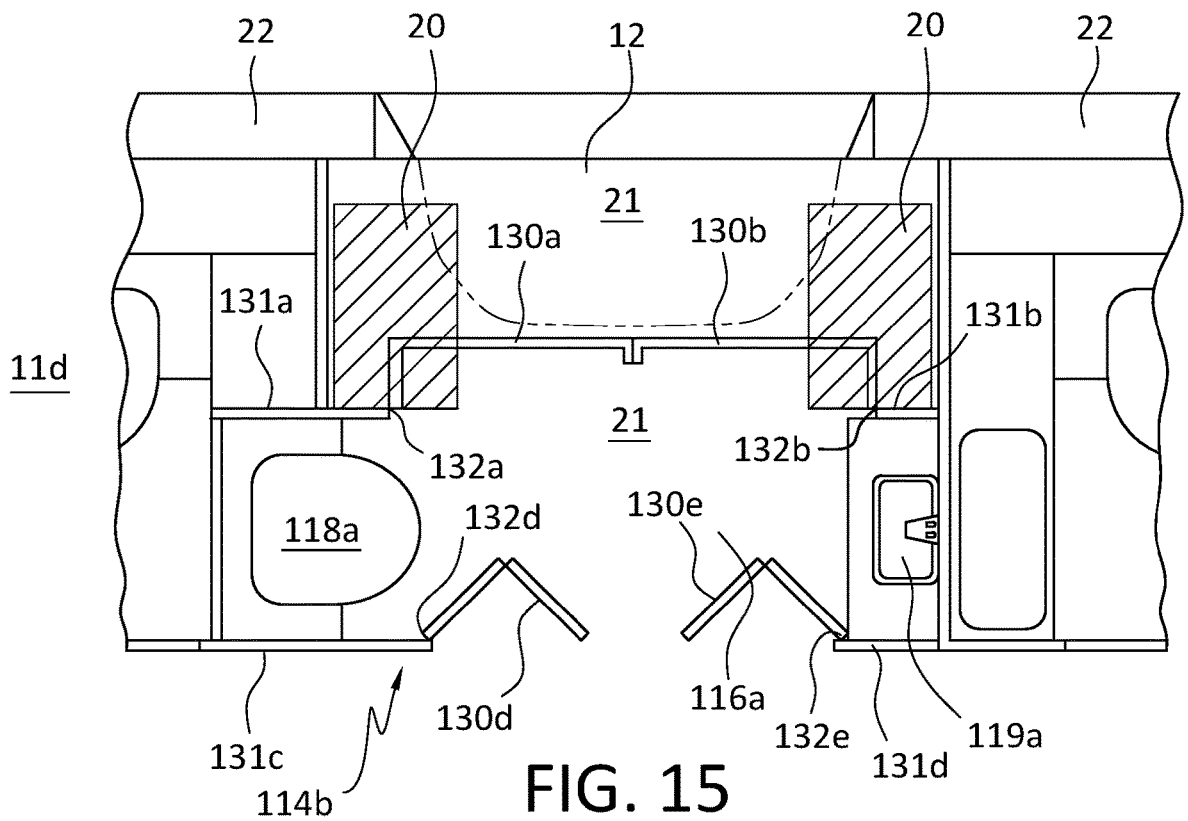
Figure 16:
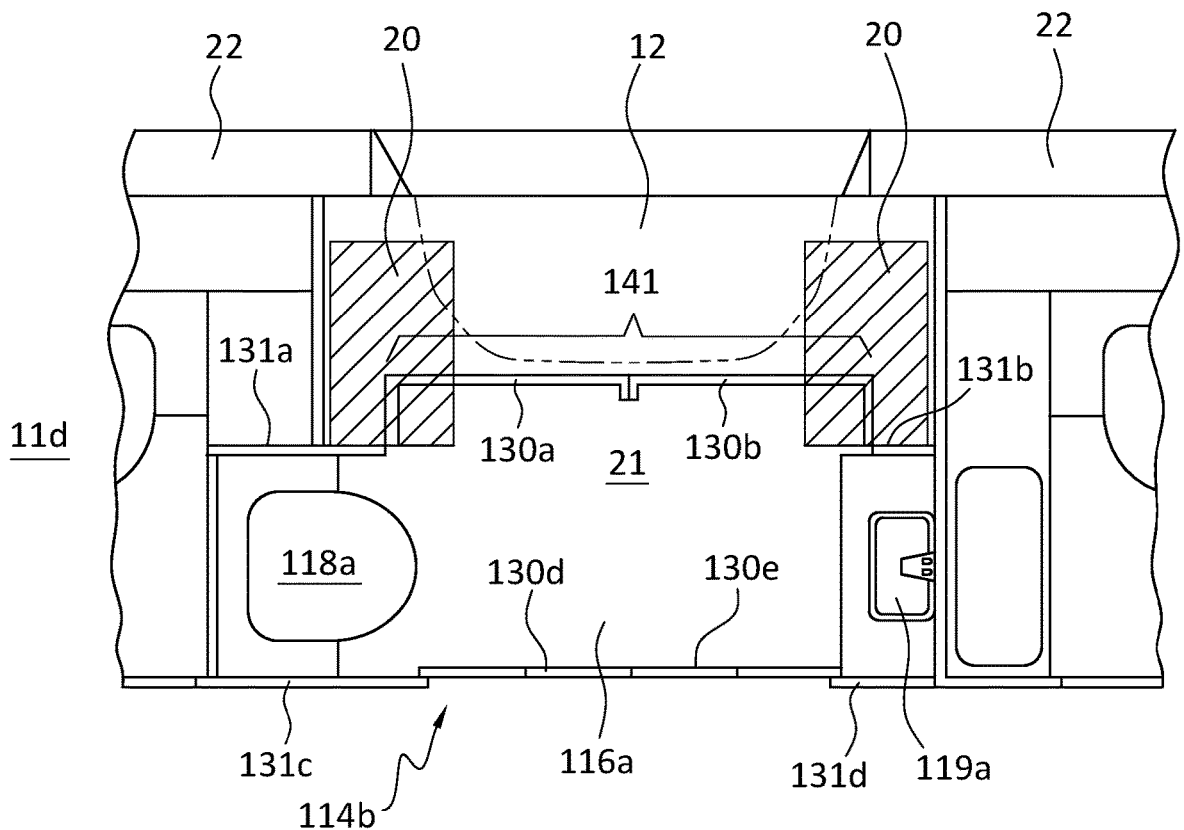
Figure 17:
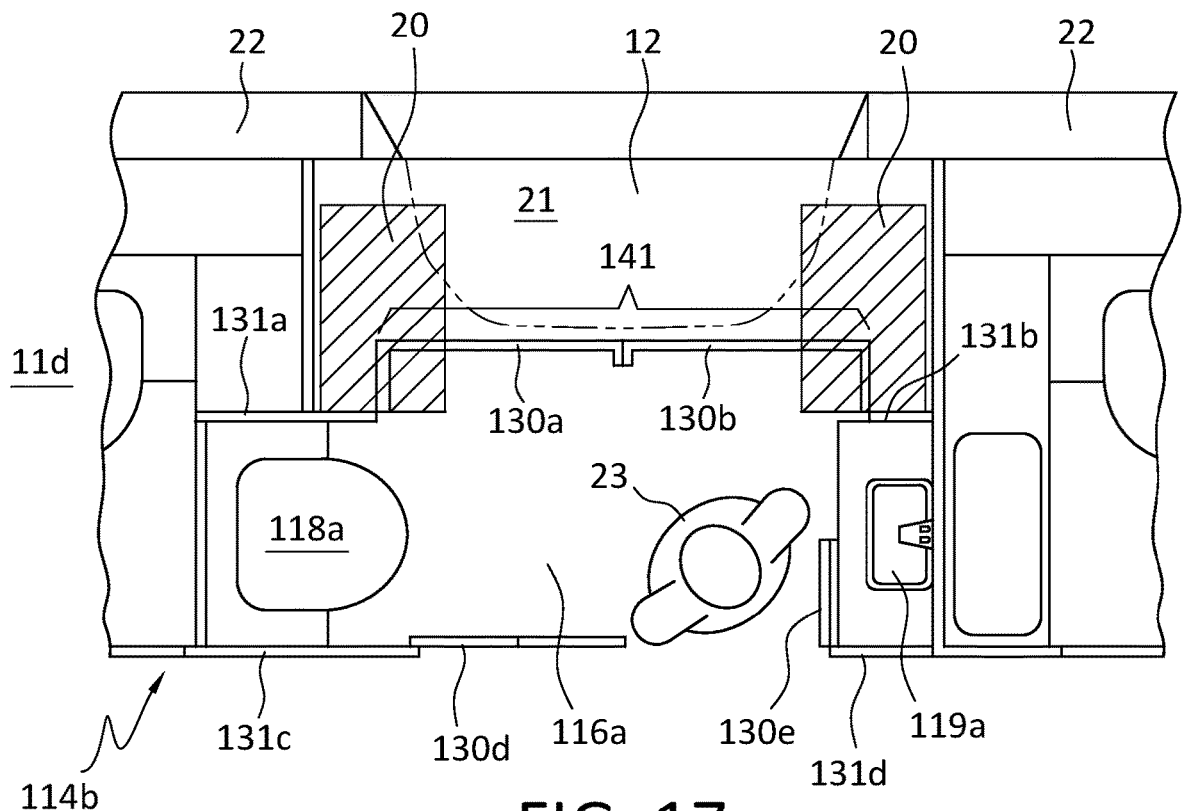
Figure 18:
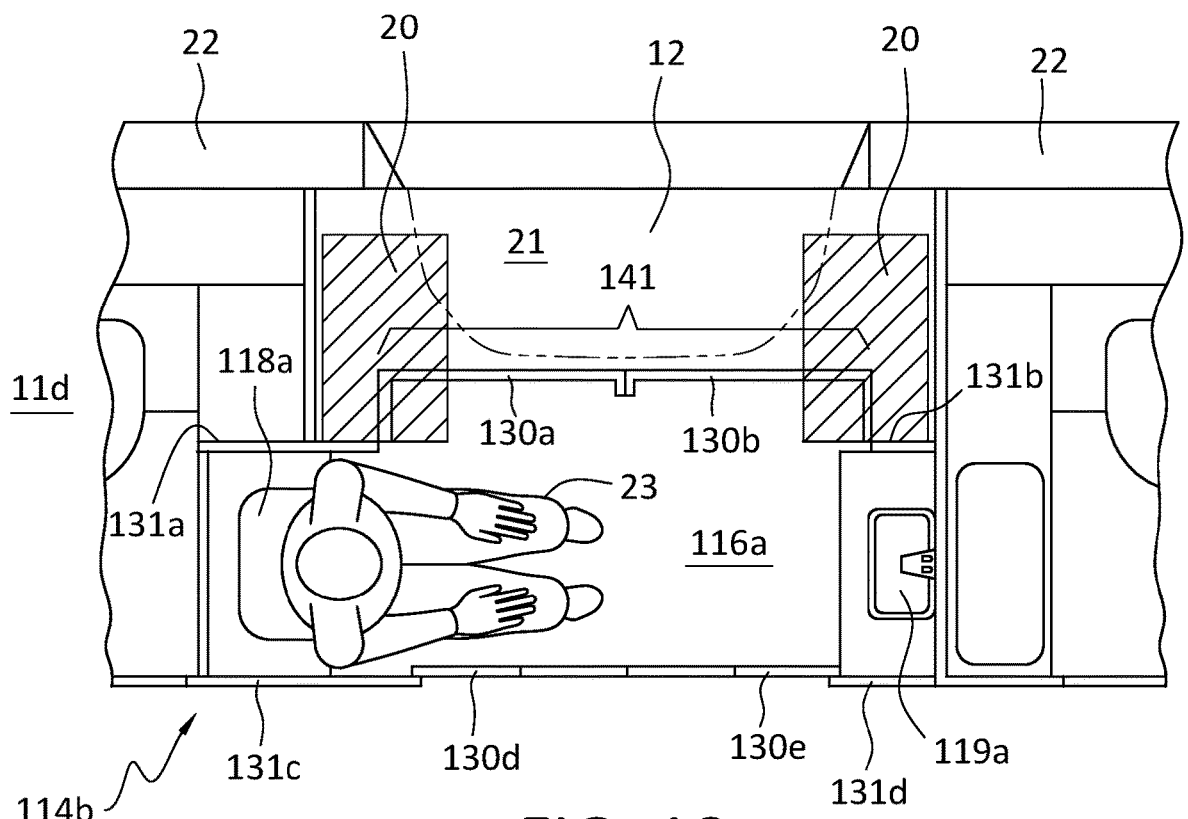
Figure 19:
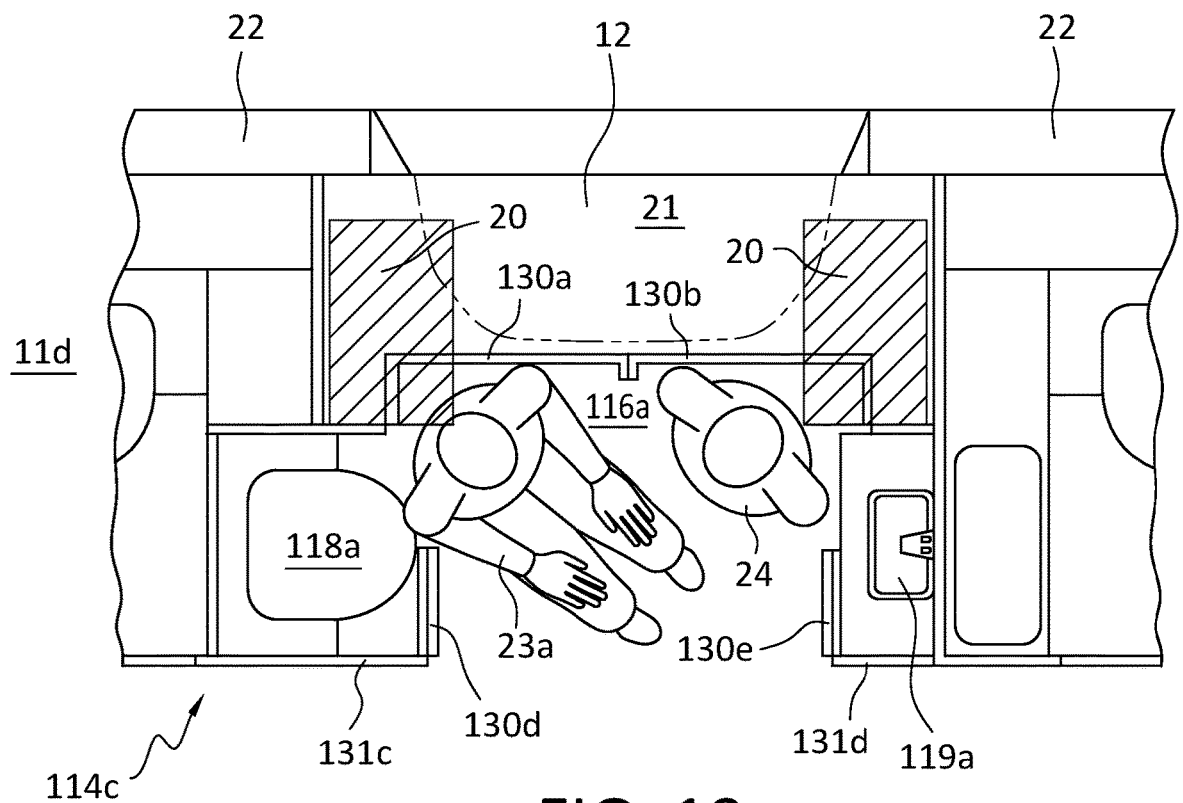
Figure 20:
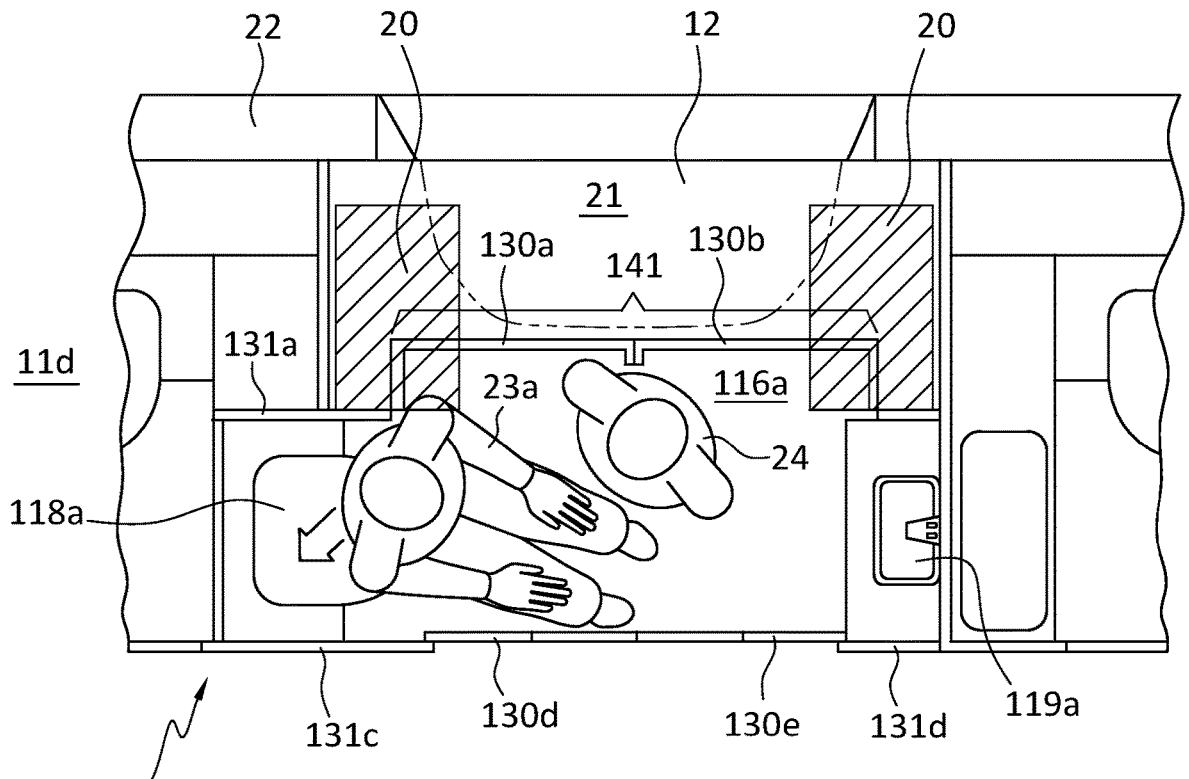
Figure 21:
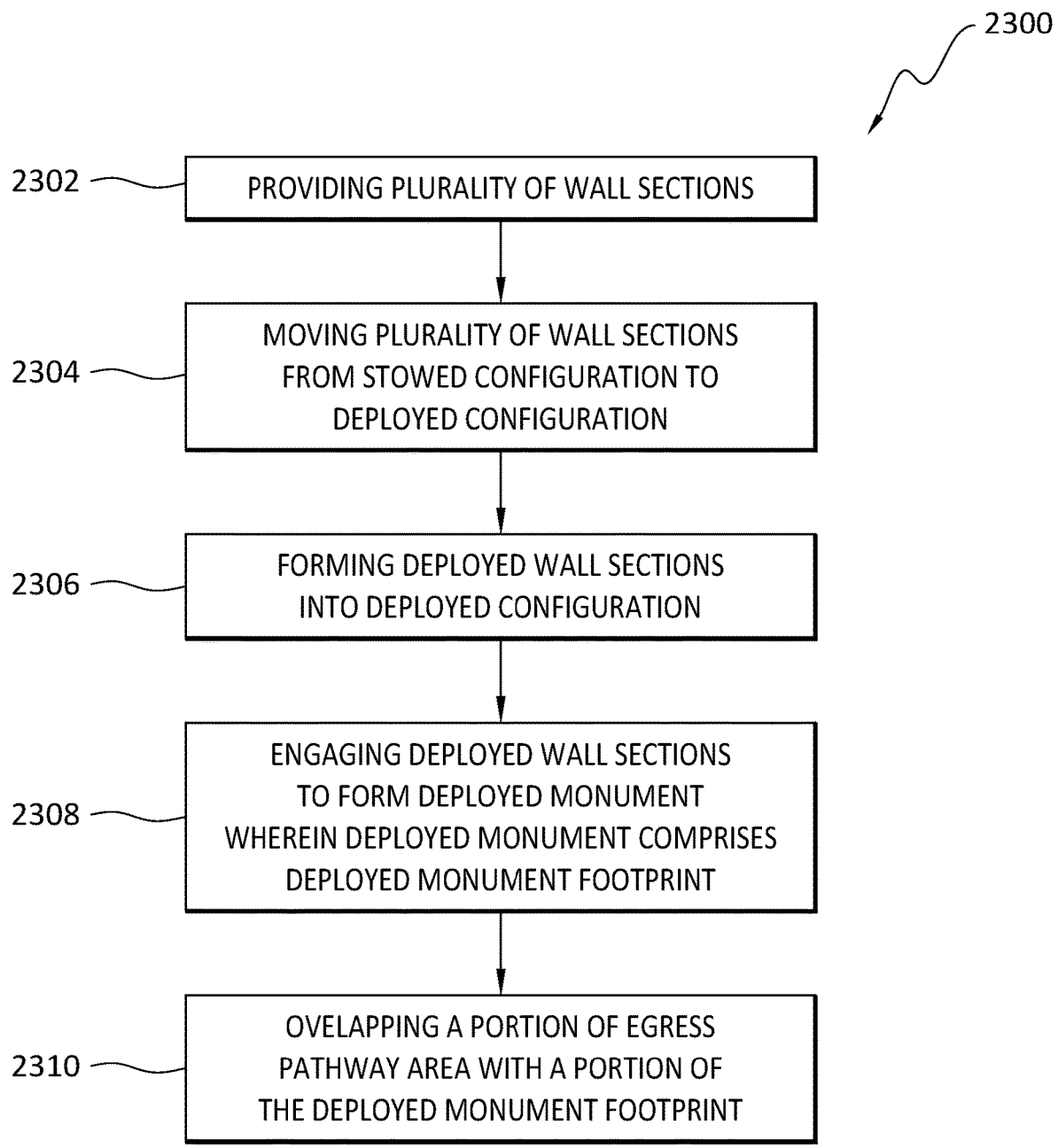
Figure 22:
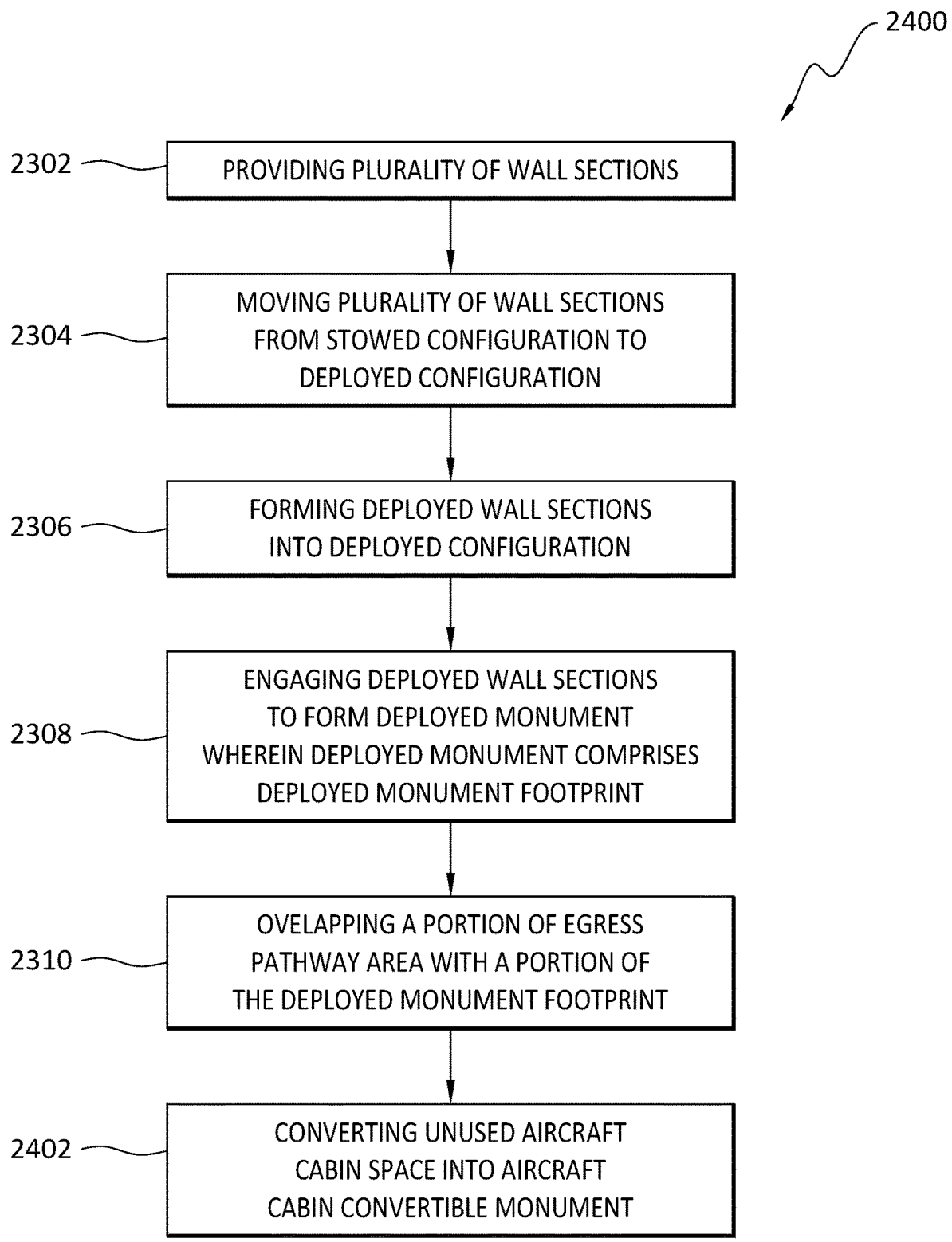
Figure 23:
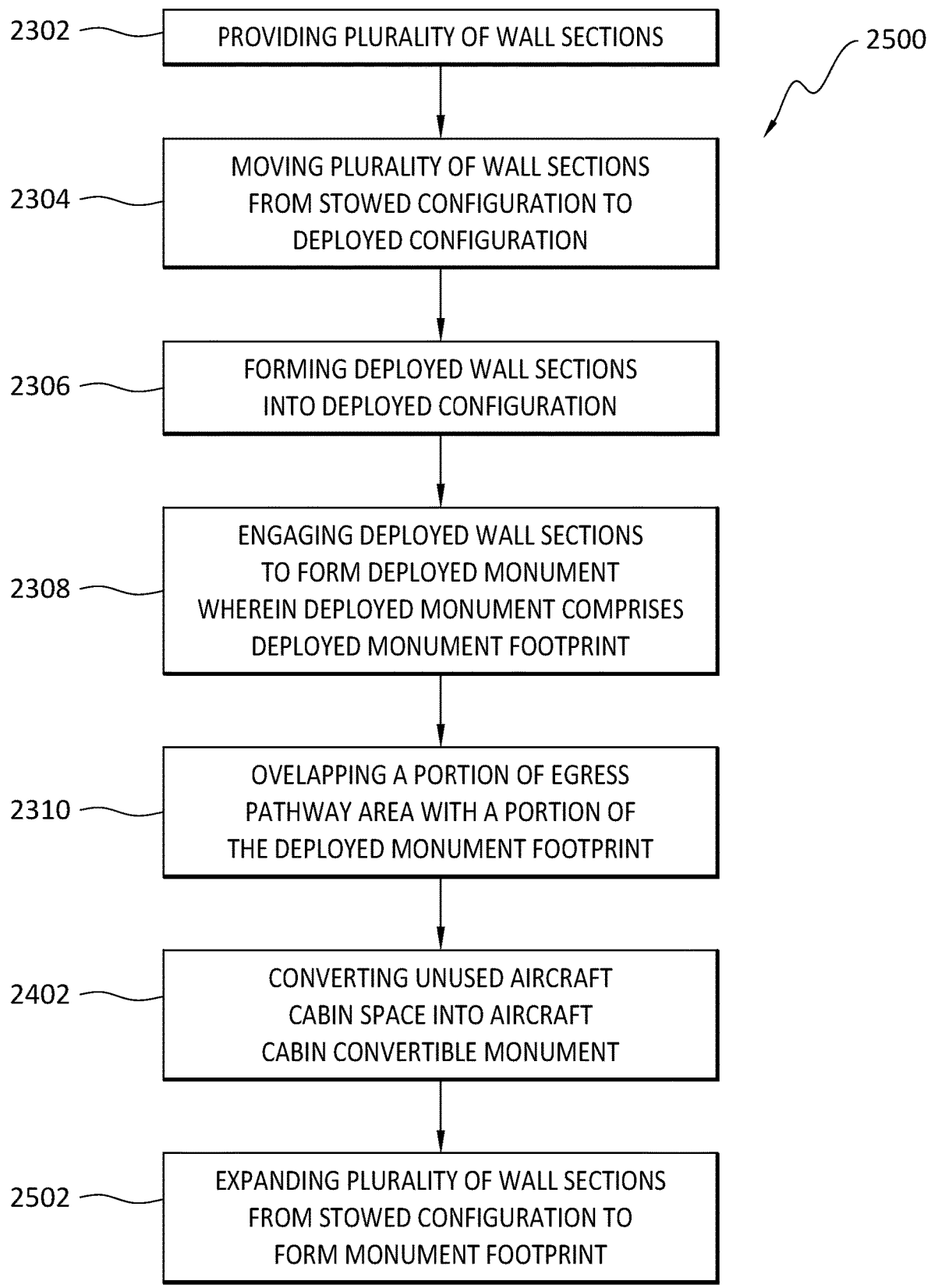

Having thus described variations of the disclosure in general terms, reference will now be made to the accompanying drawings, which are not necessarily drawn to scale, and wherein:

FIG. 1 is an illustration of an aircraft according to present aspects;

FIG. 2 is an overhead view of an aircraft passenger cabin showing typical monument locations;

FIG. 3 is an overhead view of an aircraft passenger cabin showing typical monument locations;

FIG. 4 is an overhead view of a portion of an aircraft passenger cabin showing a passenger egress pathway adjacent to an aircraft door, with a stowed convertible monument, according to present aspects;

FIG. 5 is an overhead view of a portion of an aircraft passenger cabin showing a passenger egress pathway adjacent to an aircraft door, with a partially deployed convertible monument, according to present aspects;

FIG. 6 is an overhead view of an aircraft passenger cabin showing a passenger egress pathway adjacent to an aircraft door, with a partially deployed convertible monument, according to present aspects;

FIG. 7 is an overhead view of an aircraft passenger cabin showing a passenger egress pathway adjacent to an aircraft door, with a partially deployed convertible monument, according to present aspects;

FIG. 8 is an overhead view of an aircraft passenger cabin showing a passenger egress pathway adjacent to an aircraft door, with a deployed convertible monument, according to present aspects;

FIG. 9 is an overhead view of an aircraft passenger cabin showing a passenger egress pathway adjacent to an aircraft door, with a deployed convertible monument as shown in FIG. 8, and according to present aspects;

FIG. 10 is an enlarged overhead view of monument components in a stowed configuration, according to present aspects;

FIG. 11 is an enlarged overhead view of monument components in a stowed configuration, according to present aspects;

FIG. 12 is an overhead view of a convertible aircraft cabin monument in a deployed configuration according to present aspects, with the monument configured to include a single compartment;

FIG. 13 is an overhead view of an aircraft passenger cabin showing a passenger egress pathway adjacent to an aircraft door, with a stowed convertible monument, according to present aspects;

FIG. 14 is an overhead view of an aircraft passenger cabin showing a passenger egress pathway adjacent to an aircraft door, with a partially deployed convertible monument, according to present aspects;

FIG. 15 is an overhead view of an aircraft passenger cabin showing a passenger egress pathway adjacent to an aircraft door, with a convertible monument of the type as shown in FIGS. 13 and 14, with the convertible monument in a deployed configuration, according to present aspects;

FIG. 16 is an overhead view of an aircraft passenger cabin showing a passenger egress pathway adjacent to an aircraft door, with a convertible monument of the type as shown in FIGS. 13, 14, and 15, with the convertible monument in a deployed configuration, according to present aspects;

FIG. 17 is an overhead view of an aircraft passenger cabin showing a passenger egress pathway adjacent to an aircraft door, with a deployed convertible monument of the type as shown in FIGS. 14, 15, and 16 according to present aspects;

FIG. 18 is an overhead view of an aircraft passenger cabin showing a passenger egress pathway adjacent to an aircraft door, with a deployed convertible monument of the type as shown in FIGS. 14, 15, 16, and 17 according to present aspects;

FIG. 19 is an overhead view of an aircraft passenger cabin showing a passenger egress pathway adjacent to an aircraft door, with a deployed convertible monument of the type as shown in FIGS. 14, 15, 16, 17, and 18 according to present aspects;

FIG. 20 is an overhead view of an aircraft passenger cabin showing a passenger egress pathway adjacent to an aircraft door, with a deployed convertible monument of the type as shown in FIGS. 14, 15, 16, 17, 18, and 19 according to present aspects;

FIG. 21 is a flowchart outlining a method according to present aspects;

FIG. 22 is a flowchart outlining a method according to present aspects;

FIG. 23 is a flowchart outlining a method according to present aspects; and

Figure 24:
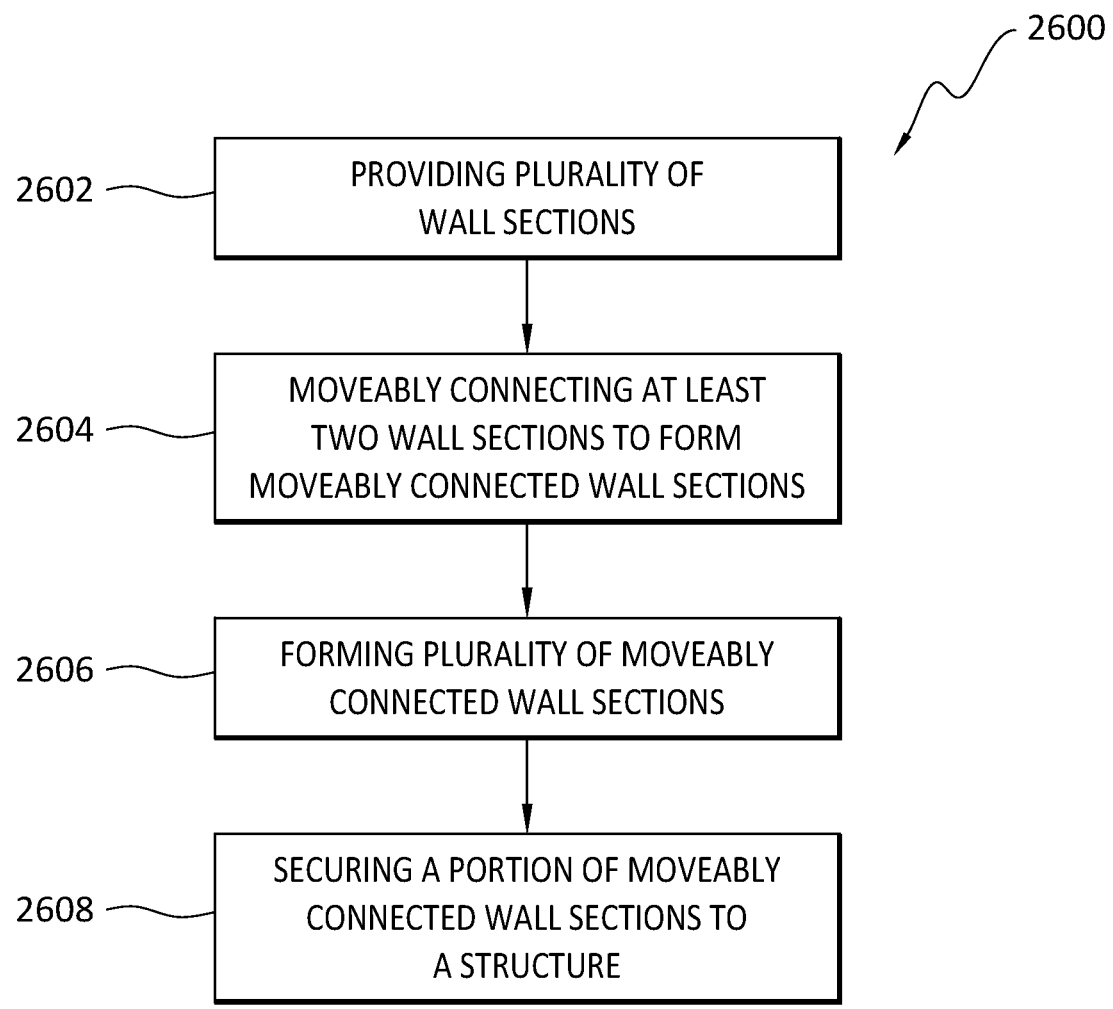

FIG. 24 is a flowchart outlining a method according to present aspects.

DETAILED DESCRIPTION

Dimensional norms of monuments in aircraft cabin interiors have benefitted the airline industry in terms of standardization. While such standardization can be useful (e.g., for manufacture, installation, etc.), the potential maximization of available aircraft cabin space has been hindered or otherwise limited by, among other things, component standardization and traditional component placement (e.g., component orientation within an aircraft cabin interior, etc.). According to present aspects, space-saving aircraft cabin monuments for aircraft interiors are disclosed that can significantly contribute to the enhanced maximization and enhanced utilization of aircraft cabin space.

According to present aspects, convertible monuments are disclosed that temporarily occupy aircraft cabin regions, areas, etc., that have not been previously utilized. By assigning (e.g., relocating, etc.) monuments from typical aircraft cabin regions to previously unused aircraft cabin regions, the area previously taken up by monuments can be reassigned for more efficient and productive uses including, for example, the installation of additional seating for increasing passenger occupancy, creating more spacious cabin environments when occupancy is not increased, etc., while, if desired, maintaining or decreasing overall weight of an aircraft.

The apparatuses, systems, and methods disclosed herein, provide temporary and convertible aircraft cabin monuments comprising one or more compartments (e.g., one or more compartments comprising a lavatory), such that the monuments can be formed by converting monument components from a stowed configuration into a deployed configuration, on demand, to form a deployed monument that also can be converted, on demand, back to a stowed configuration from a deployed configuration. In the deployed configuration, according to present aspects, the convertible aircraft cabin monuments can comprise a deployed monument footprint, with the deployed monument footprint configured to overlap at least a portion of an aircraft cabin egress pathway area that is located proximate to an aircraft door. The footprint is understood to be the outer dimension (e.g., space taken up along a perimeter) of the monument.

According to present aspects, the disclosed convertible aircraft cabin monuments can be dimensioned to be incorporated into an aircraft location that can overlap with at least a portion of an aircraft cabin egress pathway, an aircraft attendant area, or other aircraft space that had been previously rendered unused during flight, for example, due to regulations governing the space restrictions for an emergency egress from an aircraft, etc. The presently disclosed convertible aircraft cabin monuments conserve space, utilize previously unused space within an aircraft cabin, can reduce an overall monument footprint, reduce overall weight of the monument, simplify monument construction and installation, while offering enhanced monument and cabin interior versatility and tailorability, etc.

According to present aspects, the monuments described herein can comprise contained areas, and that can be deployed, on demand, from a stowed configuration (to the deployed configuration) and otherwise constructed on site during a flight (and after take-off) by personnel (e.g., flight attendants, etc.) manually or automatically, and then disassembled or otherwise returned from the deployed configuration to the stowed configuration manually or automatically, for example, before landing. According to further aspects, for example, the convertible aircraft cabin monument can be configured to contain one or more compartments, with the compartments oriented within an overall monument footprint, and with the monument (and with the compartment(s)) being convertible or "tailorable" into various predetermined configurations, and with the monument further being a temporary monument that can be dissembled and "stowed" on demand.

According to present aspects, FIG. 1 shows an aircraft 10 having multiple aircraft doors 12 and an aircraft cabin interior 11. FIG. 2 is an exposed overhead view of an aircraft, for example, the aircraft 10 of the type shown in FIG. 1. As shown in FIG. 2, according to present aspects, monuments 14 within aircraft interior 11a, are shown located near, or adjacent to an aircraft door 12. FIG. 2 further shows the outboard wall 22 of the aircraft cabin interior 11a, and passenger seat row 44 comprising a plurality of passenger seats 46. As shown in FIG. 2, the external perimeter or "footprint" of monument 14 does not encroach or overlap the region of the aircraft cabin interior considered to be a part of the regulatorily mandated and identified aircraft cabin passenger egress pathway 21 (referred to equivalently herein as an "aircraft cabin interior egress pathway area", "aircraft cabin egress pathway area", and "aircraft cabin interior passenger egress pathway"). FIG. 2 shows two monuments 14, with each monument positioned adjacent to an aircraft door 12 and further positioned adjacent to the aircraft cabin passenger egress pathway 21.

According to present aspects, FIG. 3 shows an exposed overhead view of the aircraft, for example, an aircraft 10 of the type shown in FIG. 1, and an aircraft cabin interior 11b similar to that shown as aircraft cabin interior 11a shown in FIG. 2. However, as shown in FIG. 3, according to present aspects, a single monument 14 is shown within aircraft cabin interior 11b, with the single monument shown located near, or adjacent to an aircraft door 12. FIG. 3 further shows the outboard wall 22 of the aircraft cabin interior 11a, and passenger seat row 44 comprising a plurality of passenger seats 46. As shown in FIG. 3, the external perimeter or "footprint" of monument 14 does not encroach or overlap the region of the aircraft cabin interior considered to be a part of the regulatorily mandated and identified aircraft cabin interior egress pathway 21. FIG. 3 shows the additional space, including seat gain, that can be created when a monument is removed from a particular location within an aircraft cabin. In FIGS. 2 and 3, the monument(s) shown are "fixed" or in a permanent location within the aircraft cabin interior, and the monument(s) house, or otherwise contain a lavatory.

Aircraft cabin interiors take into consideration aesthetics pleasing to passengers and economics regarding passenger count, passenger seating types, and passenger and monument locations relative to one another for the purpose of maximizing comfortable seating, optimal passenger flow through the aircraft cabin and easy passenger access to passenger accommodations including, for example, monuments that can house, for example, lavatories. In addition, various country regulations (such as, e.g., in the U.S., FAA regulations) exist specifying various aspects of aircraft cabin interior dimensions, at least with respect to, for example, passenger aircraft exit access (e.g., egress) including width of aisle, etc., and such regulations further provide the mandated area required for passenger egress in case of emergency (See, e.g., U.S. FAA regulations 14 C.F.R. §§ 25.813; 25.815, etc.).

Such regulated areas in aircraft for on ground egress, etc., typically have remained "clear" or unused in-flight, at least with respect to installed monuments including, for example, lavatory placement, galley placement, etc. That is, regulated areas that are required to remain accessible and unobstructed when the aircraft is on the ground (e.g., not in-flight), such as aircraft cabin interior egress pathways and/or attendant areas adjacent to the egress pathways, have not been utilized during flight in terms of monuments occupying such regulated spaces.

Present aspects disclose temporary, or at least temporarily deployed and convertible monuments for aircraft cabin interiors that possess reduced footprints through an improved utilization of available space that can include, within the convertible monument footprint, the use of otherwise "regulated" or "regulatorily mandated" space and pathways that must be maintained as "clear" and "unobstructed" during, for example, takeoff, landing, etc. (for example, such regulated areas are maintained as "clear" areas) for crew persons to assist passengers in the use of escape devices from an aircraft, with such areas including, for example, a 12 in.×20 in. assist space with the long dimension parallel to and clear of the required 20 in. exit approach passageway, referred to herein as the aircraft cabin "egress area").

According to present aspects, apparatuses, systems, and methods are disclosed relating to a temporary and convertible aircraft cabin monument, including a monument that can be manually or automatically reversibly configured from a stowed configuration into a deployed monument configuration, on demand. According to present aspects, FIGS. 4, 5, 6, 7, 8, and 9 illustrate a progression where monument wall components are moved from a stowed configuration to a deployed configuration to form a monument (e.g., a deployed temporary monument) that contains compartments that can function as lavatories.

FIG. 4 is an overhead view of an aircraft interior 11c showing a person 23 (e.g., that can be a passenger, an attendant, etc.) standing in an aircraft cabin egress pathway 21, with attendant area 20 shown adjacent the aircraft cabin interior egress pathway 21. FIG. 4 further shows an aircraft door 12 in the closed position, and outboard wall 22. As shown in FIG. 4, monument components, that can be fixed monument components, can include, for example, urinals 18a, 18b and sinks 19a, 19b that are hidden from view in a stowed section 120a, 120b, respectively, by monument wall sections 30a, 30b, 30c, 30d, 30e, with the monument wall sections shown in a folded and stowed configuration. The terms "stowed space" and "stowed section" are equivalent terms herein.

As shown in FIG. 4, in the stowed configuration, stowed monument wall sections enclose or otherwise contain the fixed monuments in a stowed section 120a, 120b in an area that will become partially deployed compartments 16a, 16b respectively, and when the monument is fully deployed that will become fully deployed monument compartments 116a, 116b (shown in FIGS. 8, 9). The terms "compartments" and "monument compartments" are equivalent terms herein.

FIG. 5 shows a first stage of a convertible monument deployment from a stowed configuration for a temporary monument, according to present aspects. As shown in FIG. 5, monument wall sections 30a and 30b are configured from a stowed configuration to a deployed position. Monument wall section 30a is moved from the stowed position to a deployed position through the use of a wall section folding mechanism 32a that can be, for example, a hinge, with folding mechanism 32a in communication with monument wall section 30a in further communication with fixed structure 31a. Similarly, wall section 30b is moved from the stowed position to a deployed position through the use of a wall section folding mechanism 32b that can be, for example, a hinge, with folding mechanism 32b in communication with monument wall section 30b in further communication with fixed structure 31b. The remainder of the enumerated features shown in FIG. 5 are those shown, for example, in FIG. 4.

The illustrations are non-limiting, and the number of wall sections and number and type of folding mechanisms used and incorporated with the wall sections can vary. The folding mechanisms can be traditional multi-piece hinges or can be folding mechanisms made from a single (e.g., a unitary) flexible piece that can bend suitably and repeatably to allow the wall sections incorporating the single flexible piece to fold and unfold. The number of wall sections can also vary from the relatively low number of wall sections shown in the FIGS. to a large number of wall sections that function together in, for example, an accordion-like fashion of very small individual wall sections that fold upon one another to form a single or multi-piece wall section. According to a present aspect, at least a portion of one folding wall section is in communication with or fixedly attached to a fixed structure that can include, for example, an adjoining fixed wall section or other fixed structure, with the fixed structure located: 1) outside of, but potentially adjacent to, the aircraft cabin egress area pathway; and 2) outside of, but potentially adjacent to, an attendant area.

FIG. 6 and FIG. 7 show a second stage and third stage, respectively, of a convertible monument deployment for a temporary monument, according to present aspects. As shown in FIG. 6, monument wall section 30c is moved from the stowed position to a partially deployed position through the use of a wall section folding mechanism 32c that can be, for example, a hinge, with folding mechanism 32c in communication with monument wall section 30a and further in communication with monument wall section 30c. Monument back wall section 41 is shown in a deployed configuration, with monument back wall section 41 comprising the combined length of monument wall sections 30a and 30b.

FIG. 7 shows a third stage of a convertible monument deployment for a temporary monument, according to present aspects. As shown in FIG. 7, monument wall section 30c is moved from the partially deployed position shown in FIG. 6 to a fully deployed position through the use of a wall section folding mechanisms 32c and 32c' that can be, for example, hinges. As shown in FIG. 7, folding mechanism 32c is in communication with monument wall section 30a and further in communication with monument wall section 30c'. In addition, folding mechanism 32c' is shown in FIG. 7 as being in communication with monument wall section 30a and further in communication with monument wall section 30c and monument wall section 30c'. As shown in FIG. 7, when monument wall section 30c is configured into a fully deployed position, monument wall section 30c forms a monument center wall section that can become a significant portion of a common monument interior (e.g., center) wall section to monument compartments 16a and 16b. See, for example FIG. 12, part enumerated as 37). As also shown in FIG. 7, monument back wall section 41 is shown in a deployed configuration, with monument back wall section 41 comprising the combined length of monument wall sections 30a and 30b. The remainder of the enumerated features shown in FIGS. 6 and 7 are those shown, for example, in FIGS. 4, 5 and 6.

FIG. 8 shows a fourth stage of a convertible monument deployment for a temporary and convertible aircraft cabin monument, according to present aspects. As shown in FIG. 8, monument wall section 30c is configured into the deployed position. Monument wall section 30d, as shown in FIG. 8 and according to present aspects, is moved from the stowed position to a deployed position through the use of a wall section folding mechanism 33a, 33c that can be, for example, a hinge. Similarly, wall section 30e is moved from the stowed position to a deployed position through the use of a wall folding mechanism 33b, 33d that can be, for example, a hinge. When the previously stowed monument wall sections are moved from their stowed monument wall configurations into their respective deployed monument wall configurations, convertible aircraft cabin monument 114a is formed. As shown in FIG. 8, deployed monument wall sections 30d and 30e form monument entry bi-fold doors (equivalently referred to herein as "monument doors", "monument entry doors", "monument entry sections") that provide entryways, for example, into fully deployed monument compartments 116a, 116b (also referred to equivalently herein as "fully enclosed monument compartments" 116a, 116b, even though the door to be formed by deployed wall sections 30d and 30e may not be completely closed, as shown, for example, in FIG. 9). The remainder of the enumerated features shown in FIG. 8 are those shown in FIGS. 4, 5, 6, and 7.

FIG. 9 shows the convertible aircraft cabin monument 114a as shown in FIG. 8, with monument wall sections 30d, 30e in the deployed configuration and further moved into a closed position to form fully enclosed monument compartments 116a, 116b in convertible aircraft cabin monument 114a. The remainder of the enumerated features shown in FIG. 9 are those shown in FIGS. 4, 5, 6, 7, and 8.

According to present aspects, as shown in FIGS. 8 and 9, the fully deployed monument wall sections and monument bi-fold doors border the enclosed monument compartments 116a, 116b that each house a urinal that can reside in the convertible monument, with the convertible monument having a convertible monument footprint that can be equivalent to or smaller than a monument footprint of a conventional single lavatory on an aircraft. Since the presently disclosed convertible monuments, as shown in FIGS. 8, 9, and according to present aspects, can house two compartments with each compartment housing a urinal, the passenger-to-lavatory ratio on an aircraft implementing the presently disclosed convertible monument can at least remain the same or, advantageously, can decrease. That is, the presently disclosed convertible monuments housing two lavatories can replace a conventional monument that may house one lavatory. By making use of previously unused space (e.g., the aircraft cabin egress pathway) in an aircraft cabin (by implementing the present temporary and convertible monuments), additional passenger seating can be added to the aircraft cabin (in the place of a conventional lavatory that can be removed in favor of the presently disclosed aircraft cabin convertible monument), and the total number of lavatories on board the aircraft can increase such that the passenger-to-lavatory ratio onboard the aircraft decreases advantageously.

FIGS. 10 and 11 are enlarged overhead views of the stowed sections 120a, 120b (as also shown in FIG. 4) of the convertible monument in the stowed configuration. More particularly, according to present aspects, FIGS. 10 and 11 are an enlarged overhead views of a portion of a convertible monument showing wall sections in the stowed configuration, with certain monument features (e.g., monument features that can be fixed monument features), for example, including a urinal and a sink, enclosed or otherwise contained by a plurality of monument wall sections in the stowed monument wall configuration.

As shown in FIG. 10, stowed section 120a includes urinal 18a and sink 19a that can be positioned in the stowed section 120a and that will be located in fully deployed compartment 116a of convertible aircraft cabin monument 114a in the deployed configuration. Urinal 18a and sink 19a can be fixed monument components that can be, for example, fixedly attached to structural components located within stowed section 120*a*. The monument wall sections in the stowed configuration, for example as shown in FIG. 9, are more clearly viewed in FIG. 10. As shown in FIG. 10, monument wall sections 30*c*, 30*c'*, and 30*d* in the stowed (e.g., folded, etc.) configuration will form the common wall separating compartments (e.g., 116*a*, 116*b*) in the deployed (e.g., unfolded) configuration. Wall section 30*a* is shown in FIG. 10 in the stowed configuration, with wall section 30*a* becoming a portion of the monument back wall 41 when the wall sections are oriented into the deployed configuration. According to present aspects, when the stowed monument components shown in FIG. 10 are "expanded", "unfolded", "deployed" and otherwise re-oriented from the stowed configuration to the deployed configuration, the movable wall sections 30*a*, 30*c*, 30*c'* and 30*d* combined with the fixed wall sections 31*a*, 31*b*, 31*c* (to which the movable wall section can be attached) will form the perimeter of monument first compartment 116*a* of the monument in the deployed configuration. According to present aspects, monument first compartment 116*a* can be a lavatory comprising a urinal.

As shown in FIG. 11, stowed section 120*b* includes urinal 18*b* and sink 19*b* that can be positioned in the stowed section 120*b* and that will be located in fully deployed compartment 116*b* of convertible aircraft cabin monument 114*a* in the deployed configuration. Urinal 18*b* and sink 19*b* can be fixed monument components that can be, for example, fixedly attached to structural components located within stowed section 120*b*. Wall section 30*b* is shown in FIG. 11 in the stowed configuration, with wall section 30*b* becoming a portion of the monument back wall 41 of convertible aircraft cabin monument 114*a*, when the wall sections are oriented into the deployed configuration. According to present aspects, when the stowed monument components shown in FIG. 11 are "expanded", "unfolded", "deployed" and otherwise re-oriented from the stowed configuration to the deployed configuration, the movable wall sections 30*b* and 30*e* combined with the fixed wall sections 31*d* and 31*e* (to which the movable wall section can be attached) will form the perimeter of monument first compartment 116*b* of the monument in the deployed configuration. According to present aspects, monument first compartment 116*b* can be a lavatory comprising a urinal.

FIG. 12 shows an overhead view of the monument components shown in FIG. 10, with the wall moveable wall sections now in an unfolded and deployed configuration to form compartment 16*a* of convertible aircraft cabin monument 114*a*. As further shown in FIG. 12, when foldable wall sections 30*c*, 30*c'*, 30*d* are unfolded or deployed, wall sections 30*c*, 30*c'*, 30*d* and a portion of wall section 30*a* (to which wall section 30*c'* is attached) together, in combination, form deployed monument inner wall 37 that can be a common monument inner or interior wall to fully deployed compartment 116*a* and fully deployed compartment 116*b*, for example, in convertible aircraft cabin monument 114*a* shown in the FIGS.

As shown in FIG. 10, the monument wall sections (e.g., 30*c*, 30*c'*, 30*d*), when oriented into a deployed configuration (e.g., when deployed from the stowed configuration) will form a common monument inner wall 37 (shown in FIG. 12) separating compartment 116*a* from compartment 116*b* (e.g., an inner wall that is "common" to compartment 116*a* and compartment 116*b*) in convertible aircraft cabin monument 114*a* sown in the deployed configuration. As shown in FIG. 10, the monument wall sections 30*c*, 30*c'*, 30*d* are in communication with or otherwise foldably attached to monument wall section 30*a*.

In an alternate aspect (not shown in the FIGS.), the deployed wall section 30*c*, 30*c'*, 30*d* forming a deployed monument inner common wall separating compartment 116*a* from compartment 116*b* (e.g., a single inner wall that is "common" to compartment 16*a* and compartment 16*b*) in convertible aircraft cabin monument 114*a* can be in communication with or otherwise foldably attached to monument wall section 30*b*.

In a further alternate aspect (not shown in the FIGS.), the inner wall section that separates compartment 116*a* from compartment 116*b* in convertible aircraft cabin monument 114*a*, can be a "double wall" that comprises two immediately juxtaposed and substantially overlapping inner wall sections with a first inner wall section or layer in communication with monument wall section 30*a*, and a second inner wall section or layer in communication with monument wall section 30*b*. In this aspect, at least in consideration of maintaining a predetermined deployed monument weight, etc., the first and second inner wall sections can have thickness that can be less than the thicknesses of the other moveable wall sections and fixed wall sections, since the inner wall section in the deployed configuration will have two overlapping sections.

While the urinals shown at least in FIGS. 10, 11, 12 are shown oriented proximate to a sink, further present aspects contemplate positioning a sink immediately over a urinal to further conserve space. According to further present aspects, the convertible aircraft cabin monuments can be formed from converting stowed monument wall sections to deployed monument wall sections, forming convertible aircraft cabin monuments that include a full lavatory with, for example, a toilet, sink, etc., with or without a urinal in one or more compartments of the deployed convertible aircraft cabin monument. For example, FIGS. 13-21 show present aspects with a convertible aircraft cabin monument comprising appointments typically located in an aircraft lavatory (e.g., a toilet, a sink, etc.).

According to present aspects, FIGS. 13, 14, 15 further illustrate apparatuses, systems, and methods relating to a temporary and convertible aircraft interior monument, including a monument that can be reversibly configured from a stowed configuration into a deployed monument configuration, on demand, manually or automatically. According to present aspects, FIGS. 13, 14, 15 illustrate a progression where monument wall components are moved from a stowed configuration to a deployed configuration to form a deployed monument (e.g., a deployed convertible temporary monument) that contains compartments that can function as lavatories.

FIG. 13 is an overhead view of an aircraft interior 11*d* showing a person 23 (e.g., that can be a passenger, an attendant, etc.) standing in an aircraft cabin interior egress pathway 21, with attendant areas 20 shown adjacent the aircraft cabin interior egress pathway 21, according to present aspects. FIG. 13 further shows an aircraft door 12 in the closed position, and outboard wall 22. As shown in FIG. 13, in the stowed configuration, certain monument components can be fixed monument components, that can include, for example, toilet 118*a* and sink 119*a*, are hidden from view in a stowed space 220*a* and 220*b*, respectively, by monument wall sections 130*a*, 130*b*, 130*d*, 130*e*, with the monument walls in a folded and stowed configuration. As shown in FIG. 13, in the stowed configuration, stowed monument wall sections enclose or otherwise contain the fixed monuments into a stowed section.

FIG. 14 shows a first stage of a convertible monument deployment for a temporary monument, according to present aspects. As shown in FIG. 14, monument wall sections 130*a* and 130*b* are configured to be moved from a stowed configuration to a deployed position. Monument wall section 130*a* is moved from the stowed position to a deployed position through the use of a wall section folding mechanism 132*a* (shown in FIG. 15) that can be, for example, a hinge, with wall section folding mechanism 132*a* in communication with monument wall section 130*a* in further communication with fixed structure 131*a*. Similarly, wall section 130*b* is moved from the stowed position to a deployed position through the use of a wall section folding mechanism 132*b* that can be, for example, a hinge, with folding mechanism 132*b* (shown in FIG. 15) in communication with monument wall section 130*b* in further communication with fixed structure 131*b*. The combined monument wall sections 130*a*, 130*b* in the deployed configuration form the monument back wall 141.

FIG. 15 and FIG. 16 show a second stage of a convertible monument deployment for a temporary monument, according to present aspects. As shown in FIG. 15, monument wall section 130*d*, as shown in FIGS. 15, 16 and according to present aspects, is moved from the stowed position to a deployed position by using wall section folding mechanism 132*d* that can be, for example, a hinge. Similarly, wall section 130*e* can be moved from the stowed position to a deployed position by using a wall section folding mechanism 132*e* that can be, for example, a hinge. When the previously stowed monument wall sections are moved from their stowed monument wall configurations into their respective deployed monument wall configurations, convertible (and, e.g., temporary) aircraft cabin monument 114*b* is formed. As shown in FIG. 15, deployed monument wall sections 130*d* and 130*e* form monument entry sections (equivalently referred to herein as "monument doors") that provide entryways, for example, into compartment 116*a* of the convertible aircraft cabin monument 114*b*. The remainder of the enumerated features shown in FIG. 15 are those shown in FIGS. 13 and 14.

FIG. 16 shows the convertible aircraft cabin monument 114*b* in the deployed configuration, as also shown in FIG. 15, but with monument wall sections 130*d*, 130*e* in the deployed configuration and further moved into a closed position to form fully enclosed compartment 116*a* in convertible aircraft cabin monument 114*b* with monument door closed. The remainder of the enumerated features shown in FIG. 16 are those shown in FIGS. 13, 14, and 15.

FIGS. 17, 18 are overhead views of a person 23 entering convertible aircraft cabin monument 114*b* via folding monument wall section 130*e* (with folding monument wall section configured into, for example, a door) for the purpose of occupying compartment 116*a* that has been fashioned into a convertible temporary lavatory. As shown in FIG. 18, person 23 has closed folding monument wall section 130*e* (with folding monument wall section configured into, for example, a door) for privacy and is able to move comfortably within compartment 116*a* of convertible aircraft cabin monument 114*b* to use toilet 118*a*. As shown in FIG. 18, the toilet 118*a* occupies a region of compartment 116*a* within convertible aircraft cabin monument 114*b* that allows ample shoulder width of a passenger to comfortably use toilet 118*a*.

As evidenced by the accompanying FIGS. herein, the compartments within the convertible aircraft cabin monument can be oriented into various configurations including, but not limited to configurations shown in the accompanying FIGS. such as, for example: first and second integrated lavatories; a single larger lavatory configured to accommodate, for example, persons having reduced mobility (PRM) lavatories; a "full" unisex lavatory comprising a toilet, and/or a lavatory comprising one or more urinals designed for use by biologically male-gendered passengers. According to the present disclosure, the terms "Persons with Reduced Mobility", "Passengers with Reduced Mobility", "Persons with Restricted Mobility" and/or "Passengers with Restricted Mobility" are equivalent terms that can be used interchangeably, and all such equivalent terms are covered by the abbreviation "PRM".

FIGS. 19, 20 illustrate an overhead view of a convertible temporary aircraft monument, according to present aspects, where, the convertible monument can be appointed, dimensioned, and otherwise customized to facilitate use of the monuments as lavatories to accommodate persons of reduced mobility (PRM). As shown in FIG. 19, and according to present aspects, a PRM 23*a* is shown having gained access into compartment 116*a* of convertible aircraft cabin monument 114*c* that has been configured into a lavatory with a toilet. Additional space required by a PRM to enter a contained space such as, for example, a lavatory, is provided in convertible aircraft cabin monument 114*c* via opening both folding monument wall sections 130*d* and 130*e*, with the two folding monument wall sections functioning as a pair of adjacently positioned folding doors that open "away" from each other. Either alone, or with assistance, a PRM can much more easily negotiate entry into compartment 116*a* of convertible aircraft cabin monument 114*c*. PRM assistant 24 is shown having gained access into convertible aircraft cabin monument 114*c* with PRM as evidence of the considerable and relative amount of space present in compartment 116*a* of convertible aircraft cabin monument 114*c*.

FIG. 20 shows the convertible aircraft cabin monument 114*c* shown in FIG. 19 with the PRM 23*a* having sufficient room in compartment 116*a* to maneuver onto toilet 118*a* alone or with the assistance of PRM assistant 24. The remainder of the enumerated features shown in FIG. 20 are those also shown in FIG. 19.

The FIGS. illustrate examples of folding wall sections in a compacted, stowed state that maintain the contents (e.g., monument components) of the convertible aircraft cabin monument out of view in the stowed state. In the stowed state, stowed components of the convertible monument are kept completely clear of the aircraft cabin egress pathway, including attendant areas within the egress pathway. That is, in the convertible monument stowed state, the stowed monument footprint does not encumber or overlap with any portion of: 1) the egress pathway area; or 2) the attendant area (a part of which can coincide with the aircraft cabin egress pathway area), and the convertible monument in the stowed state fully complies with regulatory demands as to maintaining the availability and clearance of an aircraft cabin egress pathway, for example, when the plane is not in flight.

When the aircraft is in flight, and the constraining regulations do not apply, the conversion from the stowed state to the deployed state that establishes the creation of the constructed temporary convertible aircraft cabin monument occurs, as a plurality of folded wall sections are deployed (e.g., extended, etc.) from the stowed state (e.g., the stowed configuration of the convertible monument) such that the deployed wall sections establish a completed convertible monument having a convertible monument footprint, and with the convertible monument footprint impinging on or otherwise overlapping with at least a portion of the aircraft cabin egress pathway.

To accomplish the deployment of the convertible monument components, the wall sections can be deployed from the stowed configuration via methods and using apparatuses in addition to those shown in and illustrated in the presently disclosed exemplary and non-limiting FIGS. For example, the specific deployment mechanisms of the wall sections through, for example, unfolding mechanisms shown in the present FIGS. can be obviated by or can work in concert with additional deployment mechanisms and methods.

According to present aspects, the stowed monument wall sections can be deployed from a stowed configuration via "unfolding" folded monument wall sections from the stowed configuration, as described herein, by manually or mechanically applying the force required for such deployment. That is, when construction of the aircraft cabin convertible monument is regulatorily allowed and access to an aircraft door (and access to the immediately adjacent aircraft cabin egress pathway) no longer provides any useful function (e.g., after takeoff, during flight, etc.), a flight attendant trained in the deployment of the convertible monument can conveniently conduct the deployment manually, and on demand, with the understanding that the manual deployment can require a predetermined amount of force within a force range that is within a suitable range of force possessed by an average human.

According to an alternate deployment scenario, and according to present aspects, the monument wall sections can be in communication with the mechanical elements used to effect movement of the plurality of wall sections mechanically and automatically through the use of powered means including, for example, and without limitation, electrically driven motors, including motors coupled to mechanical devices configured to drive the monument wall sections from a stowed configuration to a deployed configuration and to construct and otherwise assemble the temporary convertible monument.

The automated deployment and stowing of the deployed convertible monument can further include various circuitry, wiring, control panels, controllers, signal transmitters, signal receivers, etc., with the automated systems able to be initiated, for example, through the use of wireless technologies, etc., and operated from a control panel that can be located proximate to sections of the stowed convertible monument having a dedicated control. The monument controls can further be integrated into a larger control panel configured to control functions in addition to the monument deployment (e.g. assembly) and stowage (e.g., disassembly). In addition, the controls can be located remotely from the monument, for example, with the monument controls located in another region of the aircraft (e.g., flight deck, galley, etc.). Still further, the controls, if operated wirelessly, can be operated from a land-based or cloud-based solution including the use of, for example, the "internet of things", etc. Accordingly, the deployment and stowage of the convertible monuments can be controlled and effected according to predetermined timing relative to, for example, a flight itinerary, etc., with the convertible monument deployment and stowage occurring automatically upon, for example, manually inputted, or automated commands, etc.

In addition to the folded wall sections shown, if practical and allowed by aircraft cabin interior designs, the deployment and stowage of convertible monument wall sections can comprise not only the deployment and stowage of folded monument wall sections, but also wall sections that may or may not fold, and can be automatically or manually deployed from cavities or compartments in aircraft floor assemblies, ceiling assemblies, etc., or monument wall sections can be "pocketed" monument wall sections that deploy from and that can be stowed into cavities or compartments within aircraft wall, wall assemblies, etc., including, for example, fixed wall assemblies having such cavities.

FIGS. 21-24 are flowcharts outlining methods, according to present aspects. FIG. 21 outlines a method 2300 for converting unused aircraft cabin space into a convertible aircraft cabin monument comprising providing 2302 a plurality of wall sections and moving 2304 the plurality of wall sections from a stowed wall section configuration into a deployed wall section configuration to form 2306 a plurality of deployed wall sections, and orienting 2308 the plurality of deployed wall sections to form a deployed monument, with the deployed monument comprising at least one enclosed compartment. The deployed monument comprises at least one lavatory, and the deployed monument further comprises a deployed monument footprint, with the method further including overlapping 2310 a portion of the aircraft cabin egress pathway with at least a portion of the deployed monument footprint, and wherein at least a portion of the aircraft cabin egress pathway is oriented adjacent an aircraft door. The deployed monument further includes at least one lavatory and the method further includes converting unused aircraft cabin space into a convertible aircraft cabin monument with the monument comprising at least one lavatory. Methods outlined in FIG. 21 can employ the monuments and monument components illustrated in one of more of FIGS. 4-20.

According to present aspects, FIG. 22 is a flowchart outlining a method 2400 for converting unused aircraft cabin space into a convertible aircraft cabin monument comprising providing 2302 a plurality of wall sections and moving 2304 the plurality of wall sections from a stowed wall section configuration into a deployed wall section configuration to form 2306 a plurality of deployed wall sections, and orienting 2308 the plurality of deployed wall sections to form a deployed monument, with the deployed monument comprising at least one enclosed compartment. The deployed monument comprises at least one lavatory, and the deployed monument further comprises a deployed monument footprint, with the method further including overlapping 2310 a portion of the aircraft cabin egress pathway with at least a portion of the deployed monument footprint, and wherein at least a portion of the aircraft cabin egress pathway is oriented adjacent an aircraft door. The deployed monument further includes at least one lavatory and the method further includes converting unused aircraft cabin space into a convertible aircraft cabin monument with the monument comprising at least one lavatory, with the method further including converting 2402 unused aircraft cabin space into a convertible aircraft cabin monument. Methods outlined in FIG. 22 can employ the monuments and monument components illustrated in one of more of FIGS. 4-20

According to present aspects, FIG. 23 is a flowchart outlining a method 2500 for converting unused aircraft cabin space into a convertible aircraft cabin monument comprising providing 2302 a plurality of wall sections and moving 2304 the plurality of wall sections from a stowed wall section configuration into a deployed wall section configuration to form a plurality of deployed wall sections, and orienting 2308 the plurality of deployed wall sections to form 2306 a deployed monument, with the deployed monument comprising at least one enclosed compartment. The deployed monument comprises at least one lavatory, and the deployed monument further comprises a deployed monument footprint, with the method further including overlapping 2310 a portion of the aircraft cabin egress pathway with at least a portion of the deployed monument footprint, and wherein at least a portion of the aircraft cabin egress pathway is oriented adjacent an aircraft door. The deployed monument further includes at least one lavatory and the method further includes converting unused aircraft cabin space into a convertible aircraft cabin monument with the monument comprising at least one lavatory, with the method further including converting 2402 unused aircraft cabin space into a convertible aircraft cabin monument. Method 2500 further comprises expanding 2502 a plurality of wall sections from a stowed configuration to a deployed configuration to form the monument footprint. Methods outlined in FIG. 22 can employ the monuments and monument components illustrated in one of more of FIGS. 4-20.

According to further aspects, FIG. 24 is a flowchart outlining a method 2600 for installing a convertible aircraft cabin monument with the method including providing 2602 a plurality of wall sections, moveably connecting 2604 at least two wall sections of the plurality of wall sections, forming 2606 a plurality of moveably connected wall sections, and securing 2608 at least a number greater than or equal to one of the plurality of moveably connected wall sections to a fixed structure. According to present aspects, the plurality of moveably connected wall sections is configured to move from a stowed wall section configuration to a deployed wall section configuration, and with the with the plurality of moveably connected deployed wall sections in in the deployed wall section configuration forming a convertible aircraft cabin monument having a convertible aircraft cabin monument having a convertible aircraft cabin monument footprint. The convertible aircraft cabin monument footprint is configured to at least overlap a portion of the aircraft cabin egress pathway. Methods outlined in FIG. 24 can employ the monuments and monument components illustrated in one of more of FIGS. 4-20.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A fully enclosed convertible aircraft cabin temporary lavatory comprising:
a plurality of moveable wall sections, said plurality of moveable wall sections in communication with a plurality of fixed structures, said plurality of moveable wall sections configured to convert from a stowed wall section configuration to a deployed wall section configuration in a deployed state to form the fully enclosed convertible aircraft cabin temporary lavatory in the deployed wall section configuration when an aircraft is in flight, two of said plurality of movable wall sections in the deployed wall section configuration comprising:
a first folding wall section foldably attached to a fixed wall section of a first fixed monument and a second folding wall section foldable attached to a fixed wall section of a second fixed monument, said first fixed monument and said second fixed monument each located outside of and adjacent to the aircraft cabin egress pathway, said first fixed monument and said second fixed monument further each located outside of and adjacent to an attendant area, said first folding wall section and said second folding wall section configured to combine to form a temporary lavatory back wall section, said temporary lavatory back wall section positioned adjacent to an aircraft door in the deployed wall section configuration;
a further two of the plurality of moveable wall sections in the deployed wall section configuration comprising a first door section and a second door section, the first door section and the second door section configured to form a temporary lavatory entry door in the fully enclosed convertible aircraft cabin temporary lavatory;
wherein the first door section is positioned behind the first folding wall section in the stowed wall section configuration;
wherein the second door section is positioned behind the second folding wall section in the stowed wall section configuration;
wherein said fully enclosed convertible aircraft cabin temporary lavatory in the deployed wall section configuration in the deployed state comprises a deployed monument footprint;
wherein the fully enclosed convertible aircraft cabin temporary lavatory in the deployed wall section configuration in the deployed state overlaps at least a portion of an aircraft cabin egress pathway; and
wherein the fully enclosed convertible aircraft cabin temporary lavatory in the deployed state is configured to occupy aircraft cabin egress pathway space during flight, said aircraft cabin egress pathway space maintained as unobstructed aircraft cabin egress pathway space during takeoff and landing.

2. The fully enclosed convertible aircraft cabin temporary lavatory of claim 1, wherein the fully enclosed convertible aircraft cabin temporary lavatory in the deployed state overlaps at least a portion of an attendant area.

3. The fully enclosed convertible aircraft cabin temporary lavatory of claim 1, wherein the fully enclosed convertible aircraft cabin temporary lavatory comprises more than one lavatory.

4. The convertible aircraft cabin temporary lavatory of claim 1, wherein the convertible aircraft cabin temporary lavatory comprises a plurality of fully enclosed compartments, said plurality of fully enclosed compartments comprising at least a first fully enclosed compartment and at least a second fully enclosed compartment.

5. The fully enclosed convertible aircraft cabin temporary lavatory of claim 1, wherein the plurality of moveable wall sections are configured to manually convert on demand from the stowed wall section configuration to the deployed wall section configuration.

6. The fully enclosed convertible aircraft cabin temporary lavatory of claim 1, wherein the plurality of moveable wall sections configured to automatically convert on demand from the stowed wall section configuration to deployed wall section configuration.

7. The fully enclosed convertible aircraft cabin temporary lavatory of claim 1, wherein at least two of the plurality of movable wall sections are configured to attach to fixed structure.

8. The fully enclosed convertible aircraft temporary lavatory of claim 3, wherein the lavatory comprises a urinal.

9. The fully enclosed convertible aircraft cabin temporary lavatory of claim 4, wherein the first compartment and the second compartment are configured to convert into a single compartment.

10. The fully enclosed convertible aircraft cabin temporary lavatory of claim 4, wherein each of the plurality of fully enclosed compartments comprise a urinal.

11. The fully enclosed convertible aircraft cabin temporary lavatory of claim 4, wherein at least two of the plurality of fully enclosed compartments comprise an interior common wall.

12. An aircraft comprising:
a fully enclosed convertible aircraft cabin temporary lavatory, said fully enclosed convertible aircraft cabin temporary lavatory comprising a convertible aircraft cabin temporary lavatory stowed configuration and an enclosed convertible aircraft cabin temporary lavatory deployed configuration, said fully enclosed convertible aircraft cabin temporary lavatory comprising:
a plurality of moveable wall sections, said plurality of moveable wall sections in communication with a plurality of fixed structures, said plurality of moveable wall sections configured to convert from a stowed wall section configuration to a deployed wall section configuration to form the fully enclosed convertible aircraft cabin temporary lavatory in the deployed wall section configuration when an aircraft is in flight, two of said plurality of movable wall sections in the deployed wall section configuration comprising:
a first folding wall section foldably attached to a fixed wall section of a first fixed monument and a second folding wall section foldable attached to a fixed wall section of a second fixed monument, said first fixed monument and said second fixed monument each located outside of and adjacent to the aircraft cabin egress pathway, said first fixed monument and said second fixed monument further each located outside of and adjacent to an attendant area, said first folding wall section and said second folding wall section configured to combine to form a temporary lavatory back wall section, said temporary lavatory back wall section positioned adjacent to an aircraft door in the deployed wall section configuration;
a further two of the plurality of moveable wall sections in the deployed wall section configuration configured to form a temporary lavatory entry door, the further two of the plurality of movable wall sections comprising a first movable door section and a second movable door section;
wherein both the first folding wall section and the first movable door section are positioned in front of and visually obscure a first fixed monument component in the stowed configuration;
wherein both the second folding wall section and the second movable door section are positioned in front of and visually obscure a second fixed monument component in the stowed configuration;
wherein said fully enclosed convertible aircraft cabin temporary lavatory in the fully enclosed convertible aircraft cabin temporary lavatory deployed configuration comprises a deployed aircraft cabin temporary lavatory footprint;
wherein the fully enclosed convertible aircraft cabin temporary lavatory in the enclosed convertible aircraft cabin temporary lavatory deployed configuration overlaps a portion of an aircraft egress pathway; and
wherein the fully enclosed convertible aircraft cabin temporary lavatory in the fully enclosed convertible aircraft cabin temporary lavatory deployed configuration is configured to occupy aircraft cabin egress pathway space during flight, said aircraft cabin egress pathway space maintained as unobstructed space during takeoff and landing.

13. The aircraft of claim 12, wherein the fully enclosed convertible aircraft cabin temporary lavatory in the fully enclosed convertible aircraft cabin temporary lavatory deployed configuration further overlaps at least a portion of an attendant area.

14. The aircraft of claim 12, wherein the fully enclosed convertible aircraft cabin temporary lavatory in the fully enclosed convertible aircraft cabin temporary lavatory deployed configuration comprises at least one lavatory.

15. The aircraft of claim 12, wherein the enclosed convertible aircraft cabin temporary lavatory in the fully enclosed convertible aircraft cabin temporary lavatory deployed configuration comprises a plurality of enclosed compartments.

16. The aircraft of claim 15, wherein the plurality of enclosed compartments are configured to convert into a single fully enclosed compartment.

\* \* \* \* \*